(12) United States Patent
Matsumoto et al.

(10) Patent No.: US 7,801,170 B2
(45) Date of Patent: Sep. 21, 2010

(54) BIT ASSIGNMENT IN A COMMUNICATION SYSTEM AND COMMUNICATION METHOD

(75) Inventors: Wataru Matsumoto, Tokyo (JP); Hidenobu Fukushima, Tokyo (JP); Masafumi Narikawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 489 days.

(21) Appl. No.: 11/785,012

(22) Filed: Apr. 13, 2007

(65) Prior Publication Data

US 2007/0195828 A1    Aug. 23, 2007

Related U.S. Application Data

(62) Division of application No. 09/559,175, filed on Apr. 27, 2000, now Pat. No. 7,457,309.

(30) Foreign Application Priority Data

Oct. 29, 1998    (JP) ................... 10-308586

(51) Int. Cl.
  *H04J 3/16*    (2006.01)
  *H04J 3/00*    (2006.01)
(52) U.S. Cl. ...................... 370/465; 370/498
(58) Field of Classification Search ........... 370/465, 370/468, 498
See application file for complete search history.

(56) References Cited

U.S. PATENT DOCUMENTS 5,596,604 A    1/1997   Cioffi et al.
5,742,527 A    4/1998   Rybicki et al.
5,781,540 A    7/1998   Malcolm et al.
5,781,728 A    7/1998   Rybicki et al.
6,009,122 A    12/1999  Chow
6,233,251 B1   5/2001   Kurobe et al.
6,266,347 B1   7/2001   Amrany et al.
6,480,475 B1   11/2002  Modlin et al.
6,714,520 B1   3/2004   Okamura
6,747,992 B1   6/2004   Matsumoto
6,782,005 B1   8/2004   Matsumoto et al.
6,804,267 B1   10/2004  Long et al.

FOREIGN PATENT DOCUMENTS

JP    9-275387       10/1997
JP    9-321809       12/1997
JP    10-215296 A    8/1998

OTHER PUBLICATIONS

G. Lite Proposal for draft of Annex of G. lite, ITU-T, SG-15, pp. 1-25 pp. (1998).
Hamaguchi et al., IEICE, vol. 96, No. 354, pp. 51-56 (1996).
Okado et al., IEICE, p. 403 (1998).

*Primary Examiner*—Kevin C Harper
(74) *Attorney, Agent, or Firm*—Birch, Stewart, Kolasch and Birch, LLP

(57) ABSTRACT

A communication system sets the data transmission time which is the time suitable for data transmission and the quasi-data transmission time which is the time other than the data transmission time in a period in accordance with the transmission path. Further, bits are assigned and transmitted in such a manner that data for one period can be transmitted during the data transmission period for that period and the data can be uniformly distributed over the data transmission time for the period.

3 Claims, 25 Drawing Sheets

FIG.12

| $m_i$ | Parameter |
|---|---|
| $m_{47} - m_{44}$ | Minimum required SNR margin |
| $m_{43} - m_{18}$ | Reserved for future use |
| $m_{17}$ | trellis coding option |
| $m_{16}$ | echo cancelling option |
| $m_{15}$ | unused (shall be set to 1) |
| $m_{14}$ | Bitmap B mode |
| $m_{13} - m_{12}$ | Reserved for future use |
| $m_{11}$ | NTR |
| $m_{10} - m_9$ | Framing mode |
| $m_8 - m_6$ | Transmit PSD during initialization |
| $m_5 - m_4$ | Reserved |
| $m_3 - m_0$ | Maximum numbers of bits per sub-carrier supported |

FIG.13

| $m_i$ | Parameter |
|---|---|
| $m_{47} - m_{44}$ | Minimum required SNR margin |
| $m_{43} - m_{18}$ | Reserved for future use |
| $m_{17}$ | trellis coding option |
| $m_{16}$ | echo cancelling option |
| $m_{15}$ | unused (shall be set to 1) |
| $m_{14}$ | Bitmap B mode |
| $m_{13} - m_{12}$ | Low payload transfer delay mode |
| $m_{11}$ | NTR |
| $m_{10} - m_9$ | Framing mode |
| $m_8 - m_6$ | Transmit PSD during initialization |
| $m_5 - m_4$ | Reserved |
| $m_3 - m_0$ | Maximum numbers of bits per sub-carrier supported |

CONVENTIONAL ART

CONVENTIONAL ART

CONVENTIONAL ART

CONVENTIONAL ART

BIT ASSIGNMENT IN A COMMUNICATION SYSTEM AND COMMUNICATION METHOD

This application is a divisional of co-pending application Ser. No. 09/559,175, filed on Apr. 27, 2000 now U.S. Pat. No. 7,457,309, the entire contents of which are hereby incorporated by reference and for which priority is claimed under 35 U.S.C. §120 which claims priority under 35 U.S.C. §119(a) on patent application No. 10-308586 filed in Japan on Oct. 29, 1998, the entire contents of which are hereby incorporated by reference.

TECHNICAL FIELD

The present invention relates to a communication system and a communication method for performing data communication of discrete is multi-tone modem type between a plurality of data communication units through a telephone line.

BACKGROUND ART

In recent years, the xDSL communication systems including the ADSL (Asymmetric Digital Subscriber Line) communication system, the HDSL (High-bit-rate Digital Subscriber Line) communication system and the SDSL communication system for performing a high-speed digital communication of several mega bits per second using the existing telephone copper cable have been closely watched. The xDSL communication system used for these systems is called the DMT (Discrete Multi-Tone) modem system. This system is standardized in T1.413, etc. of ANSI.

This digital communication system, especially in the case where the xDSL transmission path and the ISDN transmission path of the half-duplex ISDN communication system are bound together as an aggregated line or otherwise placed adjacently to each other, poses the problem that the xDSL communication through the xDSL transmission path is affected by interference noises from the ISDN transmission path or other lines and decreases in speed. For solving this problem, various devices are introduced.

FIG. 19 shows the interference noises of an ISDN transmission path 2 from a central office (CO) 1, which affect an ADSL transmission path 3 constituting a xDSL transmission path bound with the ISDN transmission path 2 midway as an aggregated line.

When viewed from the ADSL terminal equipment (ATU-R; ADSL transceiver unit, remote terminal end) 4 constituting a communication unit at a terminal of the ADSL communication system, the interference noise transmitted through the ADSL transmission path 3 by the office equipment (ISDN LT) 7 of the ISDN transmission system is called the FEXT (Far-End crossTalk) noise, while the interference noise transmitted through the ADSL transmission path 3 by the terminal equipment (ISDN NT1) 6 of the ISDN transmission system is called the NEXT (Near-End crossTalk) noise. Especially, these noises are transmitted to the ADSL terminal equipment (ATU-R) 4 through the ADSL transmission path 3 which is coupled with the ISDN transmission path 2 midway as an aggregated line.

When viewed from the ADSL office equipment (ATU-C: ADSL transceiver unit, central office end) 5 constituting the office equipment of the ADSL communication system, on the other hand, the result is opposite from the case viewed from the ADSL terminal equipment (ATU-R) 4. In such a case, the interference noise transmitted by the office equipment (ISDN LT) 7 of the ISDN transmission system constitutes the NEXT noise, while the interference noise transmitted by the terminal equipment (ISDN NT1) 6 of the ISDN transmission system makes up the FEXT noise.

In the US ISDN communication system which is full-duplexed, the up and down transmissions are performed at the same time. When viewed from the ADSL terminal equipment (ATU-R) 4, therefore, the NEXT noise generated by the terminal equipment (ISDN NT1) 6 of the ISDN transmission system nearer to the ADSL terminal equipment (ATU-R) 4 is controlling, i.e. has a larger effect.

For this reason, during the training period of the ADSL modem (not shown) installed at the ADSL terminal equipment (ATU-R) 4, the characteristic of the NEXT noise components having a large effect is measured, and the number of transmission bits and the gain of each channel meeting the noise characteristic are determined by bit mapping. Further, in order to improve the transmission characteristics, the coefficients of the time domain equalizer (TEQ) for adaptive equalization in time domain and the frequency domain equalizer (FEQ) for adaptive equalization in frequency domain are converged and determined, so that a set of coefficient tables for NEXT noises are provided for each of TEQ and FEQ.

Although this measure eliminates the problem in the above described digital communication systems, the half-duplex communication system TCM-ISDN employed in Japan as an existing ISDN communication system, in which the up and down data transmission are switched by time division like Ping-Pong, poses the problem. Namely, in the case where the half-duplex transmission path and other transmission path are adjacently placed to each other as an aggregated line or the like, the NEXT noises and the FEXT noises from the half-duplex transmission path have an effect alternately on the communication terminals connected to the other transmission paths adjacent to the half-duplex transmission path.

In the Japanese ADSL system, therefore, a method is proposed in which the bit map is switched in accordance with the FEXT and NEXT sections of the TCM-ISDN interference noises ("G.lite: Proposal for draft of Annex of G.lite", ITU-T, SG-15, Waikiki, Hawaii 29 Jun. 3 Jul. 1998, Temporary Document WH-047).

FIG. 20 shows an outline of a digital communication system using the digital communication equipment employing the method described in the above literature.

In FIG. 20, numeral 11 designates a central office (CO) for controlling the TCM-ISDN communication and the ADSL communication, numeral 12 designates a TCM-ISDN transmission path for the TCM-ISDN communication, numeral 13 designates an ADSL transmission path for the ADSL communication, numeral 14 designates an ADSL terminal equipment (ATU-R; ADSL transceiver unit, remote terminal end) such as a communication modem for performing the ADSL communication with other ADSL communication terminal equipment (not shown) through the ADSL transmission path 13, numeral 15 designates an ADSL office equipment (ATU-C; ADSL transceiver unit, central office end) for controlling the ADSL communication within the central office 11, numeral 16 a TCM-ISDN terminal equipment (TCM-ISDN NT1) such as a communication modem for performing the TCM-ISDN communication with other TCM-ISDN terminal equipment (not shown) through the TCM-ISDN transmission path 12, numeral 17 designates a TCM-ISDN office equipment (TCM-ISDN LT) for controlling the TCM-ISDN communication in the central office 11, and numeral 18 designates a sync controller for synchronizing the communication between the TCM-ISDN office equipment (TCM-ISDN LT) 17 and the ADSL office equipment (ATU-C) 15. The sync controller 18 may alternatively be installed in the TCM-ISDN office equipment (TCM-ISDN LT) 17 or in the ADSL office equipment (ATU-C) 15.

As described above, the interference noise transmitted, through the TCM-ISDN transmission path 12 and the ADSL transmission path 13 adjacently placed to each other as an aggregated line, by the TCM-ISDN office equipment (TCM-ISDN LT) 17 providing a far half-duplex communication system when viewed from the ADSL terminal equipment (ATU-R) 14, as shown in FIG. 20, is called the "FEXT noise". On the other hand, the interference noise transmitted, through the TCM-ISDN transmission path 12 and the ADSL transmission path 13 adjacently placed to each other as an aggregated line, by the TCM-ISDN terminal equipment (TCM-ISDN NT1) 16 constituting a near half-duplex communication system is called the "NEXT noise".

When viewed from the ADSL office equipment (ATU-C) 15, on the other hand, the case is opposite to the view from the ADSL terminal equipment (ATU-R) 14. Namely, the interference noise transmitted by the office equipment (ISDN LT) 17 of the ISDN transmission system constituting the near half-duplex communication system is the NEXT noise, while the interference noise transmitted by the terminal equipment (ISDN NT1) 6 of the ISDN transmission system making up a far half-duplex communication system constitutes the FEXT noise.

FIG. 21 shows a functional configuration of a transmission unit or a dedicated transmitter (hereinafter referred to as the transmission system) such as a communication modem of the ADSL office equipment (ATU-C; ADSL transceiver unit, central office end) 15 of the digital communication system. On the other hand, FIG. 22 shows a functional configuration of a receiving unit or a dedicated receiver (hereinafter referred to as the receiving system) such as a communication modem of the ADSL terminal equipment (ATU-R) 14 of the digital communication system.

In FIG. 21, numeral 41 designates a multiplex/sync control, numerals 42, 43 designate cyclic redundancy checks (crc), numerals 44, 45 designate scramble forward error corrections (Scram & FEC), numeral 46 designates an interleave, numerals 47, 48 designate rate convertors, numeral 49 designates tone ordering, numeral 50 designates constellation encoder and gain scaling, numeral 51 designates inverse discrete Fourier transform (IDFT), numeral 52 designates a input parallel/serial buffer, and numeral 53 designates an analog processing D/A converter (DAC).

In FIG. 22, numeral 141 designates an analog processing A/D converter (ADC), numeral 142 designates a time domain equalizer (TEC), numeral 143 designates an input serial/parallel buffer, numeral 144 designates discrete Fourier transform (DFT), numeral 145 designates a frequency domain equalizer (FEQ), numeral 146 designates constellation encoder and gain scaling, numeral 147 designates tone ordering, numerals 148, 149 designate rate convertors, numeral 150 designates deinterleave, numerals 151, 152 designate descramble and forward error correction (Descram&FEC), numerals 153, 154 designate a cyclic redundancy check (crc), and numeral 155 designates multiplex/sync control.

Now, the operation will be explained. To begin with, the operation of the transmission system of the ADSL office equipment (ATU-C) 15 will be explained. In FIG. 21, the transmission data are multiplexed by the multiplex/sync control 41, and have an error detection code added thereto by the cyclic redundancy checks 42, 43, have the FEC code added thereto and subjected to the scramble processing by the scramble forward error corrections 44, 45, sometimes followed by the processing in the interleave 46. After that, the rate is converted by the rate convertors 47, 48, the tone ordering is executed by the tone ordering 49, the constellation data are produced by the constellation encoder and gain scaling 50, the inverse discrete Fourier transform is carried out by the inverse discrete Fourier transform 51, the digital waveform is converted into an analog waveform through the D/A converter, and then the signal is applied through a low-pass filter.

The operation of the receiving system of the ADSL terminal equipment (ATU-R) 14 will now be explained. In FIG. 22, the analog processing A/D converter 141 applies the received signal through a low-pass filter, and converts the analog waveform into a digital waveform through the A/D converter, followed by the time domain adaptive equalization in the time domain equalizer (TEQ) 142.

Then, the data subjected to the time domain adaptive equalization are converted from serial to parallel data by the input serial/parallel buffer 143, subjected to discrete Fourier transform in the discrete Fourier transform (DFT) 144, and then subjected to the frequency domain adaptive equalization by the frequency domain equalizer (FEQ) 145.

The constellation data are reproduced by the constellation encoder and gain scaling 146, converted into the serial data by the tone ordering 147, have the rate converted in the rate convertors 148, 149, subjected to the descramble processing and FEC by the descramble and forward error correction 151, and in some cases, after being deinterleaved by the deinterleave 150, subjected to FEC and descramble processing by the descramble and forward error correction 152. After the processing in the cyclic redundancy check 153, 154, the data are reproduced by the multiplex/sync control 155.

In this process, the sync controller 18 of the central office (CO) 11 synchronizes the transmission timing between the TCM-ISDN office equipment (TCM-ISDN LT) 17 and the ADSL office equipment (ATU-C) 15. Thus, the ADSL terminal equipment (ATU-R) 14 can recognize the timing of generation of the NEXT noise and FEXT noise.

Specifically, the ADSL terminal equipment (ATU-R) 14, by the synchronization between the TCM-ISDN communication and the ADSL communication, determines that the NEXT noise is generated in the received data or the signal received through the ADSL transmission path 13 during a predetermined time when the data are transmitted up the TCM-ISDN transmission path 12 at a known timing. On the other hand, during a predetermined time when the data are transmitted down the TCM-ISDN transmission path 12 at a known timing, the generation of the FEXT noise can be similarly recognized in the data received through the ADSL transmission path 13.

In the Japanese ADSL system, as shown in FIG. 23, the bit maps A and the bit maps B are assigned to the FEXT sections and the NEXT sections, respectively, and in the rate convertors 148, 149 of FIG. 21, more bits are assigned to the FEXT section having a small noise amount, and less bits are assigned to the NEXT section having a large noise. As a result, the transmission rate can be improved as compared with the conventional case in which the bit distribution is determined only by the NEXT section.

FIG. 24 shows the manner in which the data received at uniform rate (64 kbps in the calculation example below) are assigned to the bit maps A and the bit maps B at the time of transmission. First, the data sent in at uniform rate are stored in the form of fixed bits in units of symbols. These data are converted into bits for the bit map A and the bit map B by a rate convertor. An integer multiple is not involved, however, because the interval of the transmitted symbols is 246 μs for the ISDN period of 2.5 ms.

Thus, as shown in FIG. 25, with 34 periods (=345 symbols, 85 ms) as one unit (hyperframe), only the FEXT section in the hyperframe where the symbols are filled up is defined as a bit map A, and the other portions as a bit map B (in the drawing, SS and ISS indicate sync signals). Whether each DMT symbol is associated with the bit map A or the bit map B is determined from the following equations. In the equations below, the DMT symbol No. is assumed to be Ndmt.

Transmission from ATU-C to ATU-R $$S = 272 \times Ndmt \bmod 2760$$

if $\{(S+271<a) \text{ or } (S>a+b)\}$ then [bit map A symbol]

if $\{(S+271>=a) \text{ and } (S<=a+b)\}$ then [bit map B symbol] where a=1243, and b=1461.

Transmission from ATU-R to ATU-C $$S = 272 \times Ndmt \bmod 2760$$

if $\{(S>a) \text{ and } (S+271<a+b)\}$ then [bit map A symbol]

if $\{(S<=a) \text{ or } (S+271>=a+b)\}$ then [bit map B symbol] where a=1315, and b=1293.

An example of calculation for determining the bit assignment for the single bit map using only the bit map A is shown below.

.Number of bits of 1 DMT symbol (before rate conversion) =

(transmission rate) ×

(transmission time)/(total number of symbols (except for ISS (inverse sync symbol) and SS (sync symbol))) =

64 kbps × 85 ms/340 = 16 bits

.Number of bits of bit map A =

(transmission rate) × (transmission time)/

(total number of symbols of bit map A (except for ISS (inverse sync symbol) and

SS (side A sync symbol))) =

64 kbps × 85 ms/126 = 43.175

Thus, the bit map A is assumed to be equal to 44 bits. Also, because of the single bit map (only the bit map A is used), the bit map B is set to zero.

The following is an example of calculation for determining the bit assignment for the dual bit map where both the bit map A and the bit map B are used.

.Number of bits of 1 DMT symbol (before rate conversion) =

(transmission rate) ×

(transmission time)/(total number of symbols (except for ISS (inverse sync symbol) and SS (sync symbol))) =

64 kbps × 85 ms/340 = 16 bits

-continued

.This calculation example assumes that the number of bits of the bit map B is 3.

.Number of bits of bit map A =

((transmission rate) × (transmission time) −

(number of bits per symbol of bit map B) ×

(number of symbols of bit map B (except for ISS (inverse sync symbol)

and SS (side A sync symbol)))/

(number of symbols of bit map A (except for ISS (inverse sync symbol)

and SS (side A sync symbol))) =

(64 kbps × 85 ms − 3 × 214)/126 = 38.079 bits

Thus, the bit map A has 39 bits. When changing the bit distribution by a rate convertor in this way, the data are output after being stored to some degree in the rate convertor at the transmitting end or the receiving end, and therefore a delay time occurs in the rate convertor. Further, with a single bit map, the transmission data are assigned to the bit map A as fully as possible by hyperframe, and therefore the data of some period may be assigned to the bit map A of subsequent periods. Thus, such data causes a further delay time. Also in the case of the dual bit map, bits are assigned to the bit map A and the bit map B of the hyperframe as fully as possible, and therefore the data of a given period may be assigned to the subsequent periods, with the result that a further delay time is caused for such data. In this conventional system, the problem of an excessive delay is posed.

Accordingly, the object of the present invention, which has been developed to solve this problem, is to provide a communication system and a communication method capable of suppressing the delay.

DISCLOSURE OF THE INVENTION

According to the present invention, there is provided a communication system for setting a data transmission time constituting the time suitable for data transmission in a period and a quasi-data transmission time constituting the time other than the data transmission time in the same period in accordance with the transmission path, wherein bits are assigned so that the first data for one period can be transmitted during the data transmission time of the particular period and the first data are distributed uniformly over the data transmission time of the period.

Also, according to the present invention, there is provided a communication system for setting a data transmission time constituting the time suitable for data transmission in a period and a quasi-data transmission time constituting the time other than the data transmission time in the same period in accordance with the transmission path, wherein bits are assigned so that the data for one period can be transmitted during the data transmission time and the quasi-data transmission time of the particular period and the data are distributed uniformly over each of the data transmission time and the quasi-data transmission time of the period.

Also, according to the present invention, there is provided a communication system for setting a data transmission time constituting the time suitable for data transmission in a period and a quasi-data transmission time constituting the time other than the data transmission time in the same period in accordance with the transmission path and transmitting by multiplexing first and second data, wherein bits are assigned so that the first data for one period can be transmitted during the data transmission time of the particular period and the first data are distributed uniformly over the data transmission time of the period, and wherein the second data of a predetermined period can be transmitted in the portion of the data transmission time of the predetermined period where the first data have not been assigned.

Also, according to the present invention, there is provided a communication system for setting a data transmission time constituting the time suitable for data transmission in a period and a quasi-data transmission time constituting the time other than the data transmission time in the same period in accordance with the transmission path and transmitting by multiplexing first and second data, wherein bits are assigned so that the first data for one period can be transmitted during the data transmission time and the quasi-data transmission time of the particular period and the first data are distributed uniformly over each of the data transmission time and the quasi-data transmission time of the period, and wherein the second data of a predetermined period can be transmitted in the portion of the data transmission time and the quasi-data transmission time of the predetermined period where the first data have not been assigned.

Also, according to the present invention, there is provided a communication system for setting a data transmission time constituting the time suitable for data transmission in a period and a quasi-data transmission time constituting the time other than the data transmission time in the same period in accordance with the transmission path, wherein bits are assigned so that the data for one period can be transmitted during the data transmission time of the particular period, the data so transmitted and distributed uniformly over the data transmission time of the period are received, and all the data for the particular period are reproduced based on the portion of the received data assigned to the data transmission time of the same period.

Also, according to the present invention, there is provided a communication system for setting a data transmission time constituting the time suitable for data transmission in a period and a quasi-data transmission time constituting the time other than the data transmission time in the same period in accordance with the transmission path, wherein bits are assigned so that the data for one period can be transmitted during the data transmission time and the quasi-data transmission time of the particular period, the data so transmitted and distributed uniformly over each of the data transmission time and the quasi-data transmission time of the period are received, and all the data for the particular period are reproduced based on the portion of the received data assigned to the data transmission time and the quasi-data transmission time of the same period.

Also, according to the present invention, there is provided a communication system for setting a data transmission time constituting the time suitable for data transmission in a period and a quasi-data transmission time constituting the time other than the data transmission time in the same period in accordance with the transmission path and transmitting by multiplexing first and second data, wherein bits are assigned so that the first data for one period can be transmitted during the data transmission time of the particular period and the first data are distributed uniformly over the data transmission time of the period, so that the second data of a predetermined period can be transmitted in the portion of the data transmission time of the predetermined period where the first data have not been assigned, and so that the data so assigned and transmitted are received and all the first data of one period are reproduced based on the portion of the received first data assigned to the data transmission time for the period, and wherein all the second data of a predetermined period are reproduced based on the received second data assigned to the data transmission time of the predetermined period.

Also, according to the present invention, there is provided a communication system for setting a data transmission time constituting the time suitable for data transmission in a period and a quasi-data transmission time constituting the time other than the data transmission time in the same period in accordance with the transmission path and transmitting by multiplexing first and second data, wherein bits are assigned so that the first data for one period can be transmitted during the data transmission time and the quasi-transmission time of the particular period and the first data are distributed uniformly over each of the data transmission time and the quasi-data transmission time of the period, and so that the second data of a predetermined period can be transmitted in the portion of the data transmission time and the quasi-data transmission time of the predetermined period where the first data have not been assigned, wherein the data so assigned and transmitted are received, and all the first data of one period are reproduced based on the portion of the received first data assigned to the data transmission time and the quasi-data transmission time, while all the second data of a predetermined period are reproduced based on the portion of the received second data assigned to the data transmission time and the quasi-data transmission time of the predetermined period.

Also, according to the present invention, there is provided a communication method for setting a data transmission time constituting the time suitable for data transmission in a period and a quasi-data transmission time constituting the time other than the data transmission time in the same period in accordance with the transmission path, wherein bits are assigned so that the first data for one period can be transmitted during the data transmission time of the particular period and the first data are distributed uniformly over the data transmission time of the period.

Also, according to the present invention, there is provided a communication method for setting a data transmission time constituting the time suitable for data transmission in a period and a quasi-data transmission time constituting the time other than the data transmission time in the same period in accordance with the transmission path, wherein bits are assigned so that the data for one period can be transmitted during the data transmission time and the quasi-data transmission time of the particular period and the data are distributed uniformly over each of the data transmission time and the quasi-data transmission time of the period.

Also, according to the present invention, there is provided a communication method for setting a data transmission time constituting the time suitable for data transmission in a period and a quasi-data transmission time constituting the time other than the data transmission time in the same period in accordance with the transmission path and transmitting by multiplexing first and second data, wherein bits are assigned so that the first data for one period can be transmitted during the data transmission time of the particular period and the first data are distributed uniformly over the data transmission time of the period, and wherein the second data of a predetermined period can be transmitted in the portion of the data transmission time of the predetermined period where the first data have not been assigned.

Also, according to the present invention, there is provided a communication method for setting a data transmission time constituting the time suitable for data transmission in a period and a quasi-data transmission time constituting the time other than the data transmission time in the same period in accordance with the transmission path and transmitting by multiplexing first and second data, wherein bits are assigned so that the first data for one period can be transmitted during the data transmission time and the quasi-data transmission time of the particular period and the first data are distributed uniformly over each of the data transmission time and the quasi-data transmission time of the period, and wherein the second data of a predetermined period can be transmitted in the portion of the data transmission time and the quasi-data transmission time of the predetermined period where the first data have not been assigned.

Also, according to the present invention, there is provided a communication method for setting a data transmission time constituting the time suitable for data transmission in a period and a quasi-data transmission time constituting the time other than the data transmission time in the same period in accordance with the transmission path, wherein bits are assigned so that the data for one period can be transmitted during the data transmission time of the particular period, the data so transmitted and distributed uniformly over the data transmission time of the period are received, and all the data for the particular period are reproduced based on the portion of the received data assigned to the data transmission time of the same period.

Also, according to the present invention, there is provided a communication method for setting a data transmission time constituting the time suitable for data transmission in a period and a quasi-data transmission time constituting the time other than the data transmission time in the same period in accordance with the transmission path, wherein bits are assigned so that the data for one period can be transmitted during the data transmission time and the quasi-data transmission time of the particular period, the data so transmitted and distributed uniformly over each of the data transmission time and the quasi-data transmission time of the period are received, and all the data for the particular period are reproduced based on the portion of the received data assigned to the data transmission time and the quasi-data transmission time of the same period.

Also, according to the present invention, there is provided a communication method for setting a data transmission time constituting the time suitable for data transmission in a period and a quasi-data transmission time constituting the time other than the data transmission time in the same period in accordance with the transmission path and transmitting by multiplexing first and second data, wherein bits are assigned so that the first data for one period can be transmitted during the data transmission time of the particular period and the first data are distributed uniformly over the data transmission time of the period, so that the second data of a predetermined period can be transmitted in the portion of the data transmission time of the predetermined period where the first data have not been assigned, and so that the data so assigned and transmitted are received and all the first data of one period are reproduced based on the portion of the received first data assigned to the data transmission time for the period, and wherein all the second data of a predetermined period are reproduced based on the received second data assigned to the data transmission time of the predetermined period.

Also, according to the present invention, there is provided a communication method for setting a data transmission time constituting the time suitable for data transmission in a period and a quasi-data transmission time constituting the time other than the data transmission time in the same period in accordance with the transmission path and transmitting by multiplexing first and second data, wherein bits are assigned so that the first data for one period can be transmitted during the data transmission time and the quasi-data transmission time of the particular period and the first data are distributed uniformly over each of the data transmission time and the quasi-data transmission time of the period, and so that the second data of a predetermined period can be transmitted in the portion of the data transmission time and the quasi-data transmission time of the predetermined period where the first data have not been assigned, wherein the data so assigned and transmitted are received, and all the first data of one period are reproduced based on the portion of the received first data assigned to the data transmission time and the quasi-data transmission time, while all the second data of a predetermined period are reproduced based on the portion of the received second data assigned to the data transmission time and the quasi-data transmission time of the predetermined period.

BRIEF DESCRIPTION OF THE DRAWINGS

FIG. 12 is a diagram for explaining a table delivered between the transmitting and receiving ends at the time of executing the initialization process for the conventional communication system, FIG. 13 is a diagram for explaining a table delivered between the transmitting and receiving ends at the time of executing the initialization process for the communication system according to the present invention.

BEST MODE FOR CARRYING OUT THE INVENTION

A communication system and a communication method according to an embodiment of the present invention will be explained below.

Figure 21:
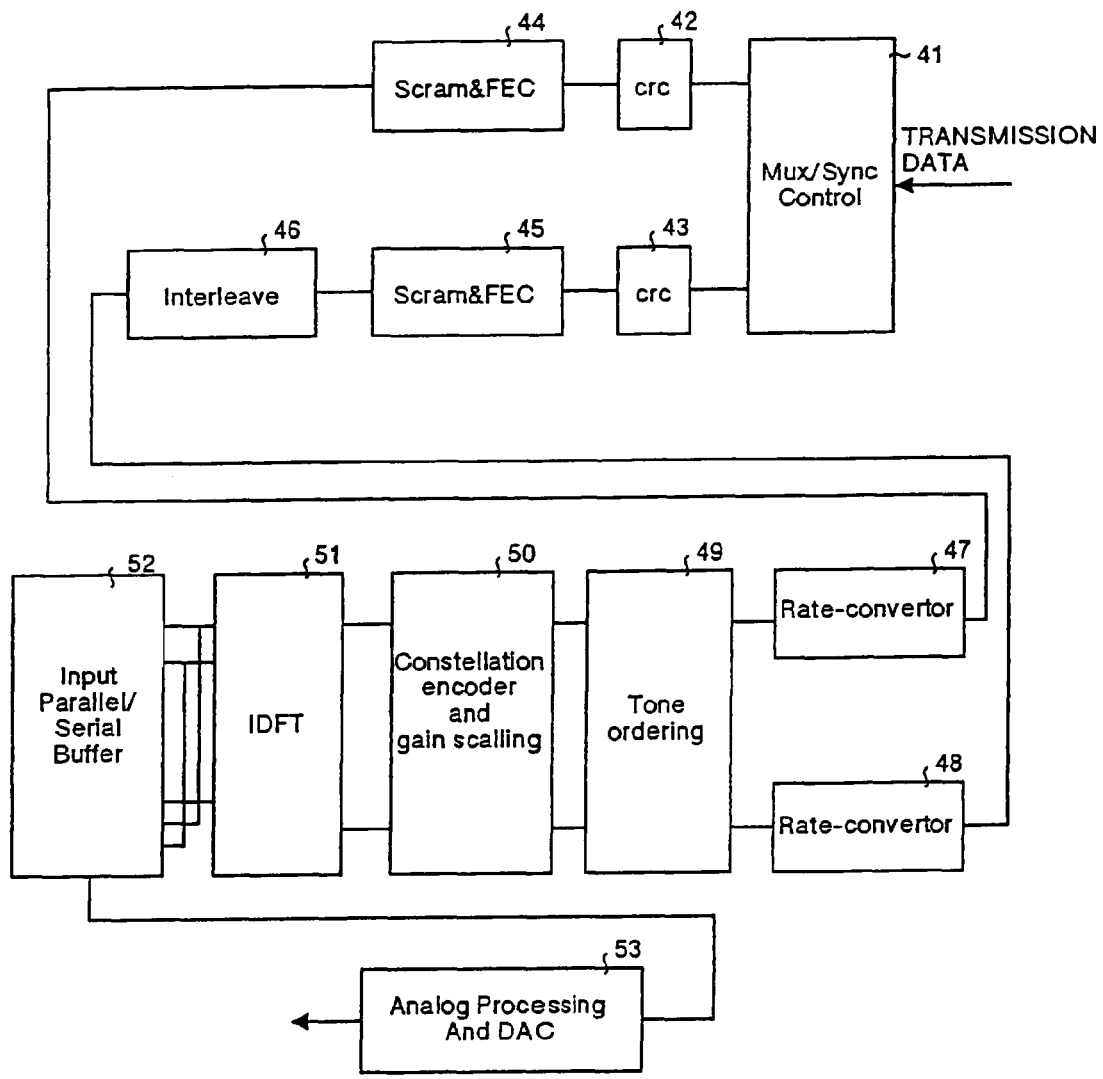
FIG. 21 is a functional configuration diagram showing the transmission function of the ADSL office equipment.

In order to suppress the delay, bits are assigned in such a manner that the transmission data of one period can be transmitted during the data transmission time of that particular period. The bit assignment is conducted by rate converters 47, 48 shown in FIG. 21 like the conventional communication system.

Figure 1:
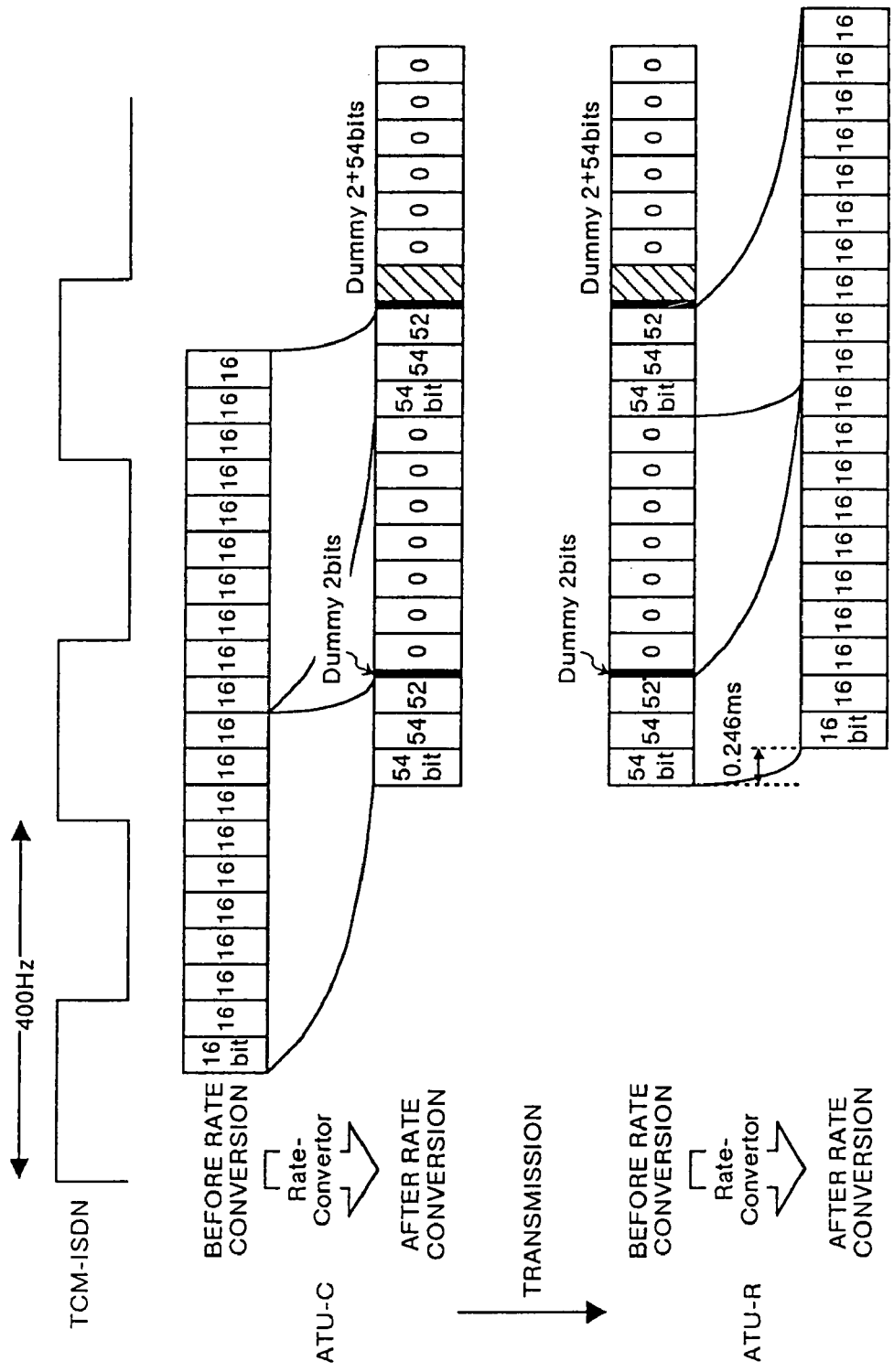
FIG. 1 is a diagram for explaining the bit assignment for a communication system according to the present invention.

FIG. 1 shows an outline of the bit assignment. Bits are assigned in such a manner that uniform data of one period can all be transmitted during the data transmission time which is the time (corresponding to the FEXT section described above) suitable for data transmission in that particular period. Also, dummy data are inserted and transmitted in the portion of the data transmission time to which the data could not be assigned.

Now, an example of calculation for determining the bit assignment will be explained with reference to the single bit map using only the bit map A. Bits are assigned, for example, in such a manner that one period (2.5 ms) of data, i.e. ten DMT symbols of data are inserted in three symbols of the bit map A (symbols that can be fully inserted in the data transmission time), and dummy bits are assigned to the bits, if any, remaining in the third symbol of the bit map A. Further, in the case where the bit map A has four successive symbols (0th period and first period in FIG. 25, for example), on the other hand, dummy bits are assigned to the entire fourth symbol of the bit map A. Specifically, the number of bits of the bit map A is required to meet the following conditions.

(Number of bits of bit map A)×3≧(transmission rate in kbps)×(one period 2.5 ms)

The specifications for this bit assignment are as follows (an example of calculation of the bit assignment for the possible data transmission rate of 64 kbps for the ADSL transmission path as determined based on the S/N ratio measured during the training period as described above in the embodiment is considered).

.Number of bits of 1 *DMT* symbol (before rate conversion) =

(transmission rate) ×

(transmission time)/(total number of symbols (except for *ISS* (inverse sync symbol) and *SS* (sync symbol))) =

64 kbps × 85 ms/340 = 16 bits

.Number of bits of bit map $A$ =

(number of bits of 1 *DMT* symbol) ×

(ten *DMT* symbols)/(3 symbols) = 16 × 10/3 = 53.33

Thus, the bit map A is equal to 54 bits.

.Dummy bits for third bit map $A$ in each period =

(number of bits of bit map $A$) × (3 symbols) −

(number of bits for 1 *DMT* symbol) × (ten *DMT* symbols) =

54 × 3 − 16 × 10 = 2 bits

Figure 2:
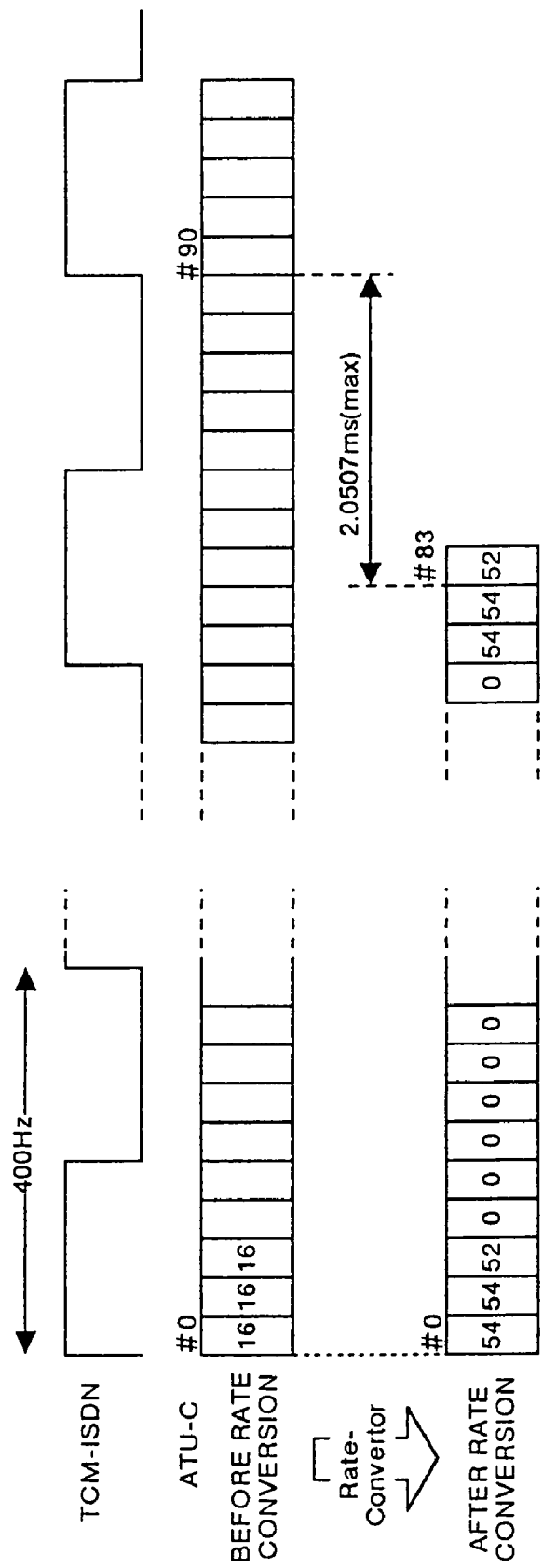
FIG. 2 is a diagram for explaining the transmission delay time in a single bit map according to the present invention.

In the presence of the fourth bit map A, dummy bits are used for all the transmission bits. Also, due to the single bit map (only the bit map A is used), the bit map B is set to zero bit. In this bit distribution, the delay time is given as follows (see FIG. 2).

.Transmission delay time (worst value is for symbol No. 83) =

(time required for storing total number of bits transmitted) −

(symbol No.) × (one symbol time) =

(total number of bits transmitted)/(transmission rate) −

(symbol No.) × (one symbol time) =

9 × 160/64 kbps − 83 × (0.25 ms × 272/276) = 2.05072 ms

At the receiving end, on the other hand, the data sent in are converted into a uniform rate. In this process, it may happen that the data which otherwise should have arrived at uniform rate may fail to arrive so due to the change in bit distribution at the time of transmission at the transmitting end (see FIG. 3). This delay time at the receiving end is maximum for symbol No. 152 in the case of FIG. 25.

.Receiving delay time (worst value is for symbol No. 152) =

(symbol No. +1) × (one symbol time) −

(total number of bits transmitted)/(transmission rate) =

153 × 0.25 ms × 272/276 − 15 × 160/64 kbps = 0.19565 ms

In order not to interrupt the data after rate conversion due to this delay at the receiving end, the corresponding amount is offset using a buffer or the like. As a result, the sum 0.44203 ms of this offset (0.19565 ms) and one symbol time (0.24637 ms) constituting the processing delay in the discrete Fourier transform (DFT) is determined as the receiving delay.

Thus, for the transmission rate of 64 kbps, the sum 2.49275 ms of the transmission delay time (2.05072 ms) and the receiving delay time (0.44203 ms) makes up the maximum delay time in the transmission and receiving units.

The following is an example of calculation for determining the bit assignment for the dual bit map where both the bit map A and the bit map B are used. The bit assignment is conducted by rate convertors 47, 48 shown in FIG. 21 like the conventional communication system.

Figure 4:
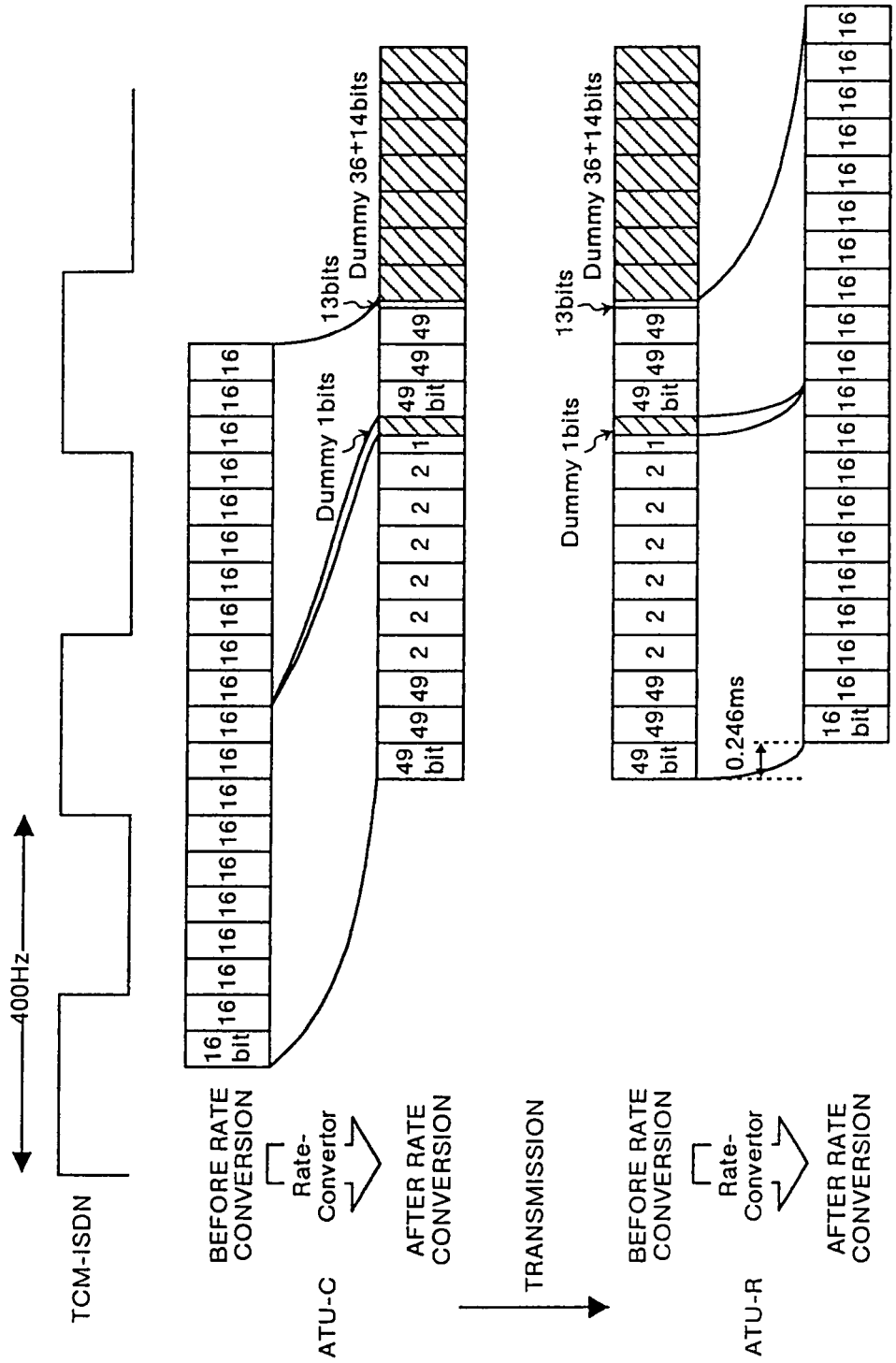
FIG. 4 is a diagram for explaining the bit assignment for a communication system according to the present invention.

FIG. 4 shows an outline of the bit assignment. In order to suppress the delay, bits are assigned in such a manner that uniform data of one period can be transmitted during the data transmission time which is the time (corresponding to the FEXT section described above, for example) suitable for data transmission and the quasi-data transmission time (corresponding to the NEXT section described above, for example) other than the data transmission time in the particular period. Also, dummy bits are inserted and transmitted in the portion of the data transmission time and the quasi-data transmission time to which the transmission data were not assigned.

Bits are assigned, for example, in such a manner that one period (2.5 ms) of data, i.e. ten DMT symbols of data (before rate conversion) are inserted in three symbols of the bit map A (symbols that can be fully inserted in the data transmission time) and seven symbols of the bit map B (quasi-data transmission time) as ten symbols unit (after rate conversion) (except for ISS (inverse sync symbol) and SS (sync symbol)), and dummy bits are inserted in the portion of the bit map B not assigned the data. Further, in the case where the bit map A has four successive symbols, on the other hand, the transmission data are assigned to the fourth symbol of the bit map A at the same bit assignment rate as the bit map A described above, and dummy bits are inserted in the portion of the bit map A and the bit map B not assigned the data. In this process, the delay amount can be reduced by minimizing the difference between the number of bits assigned to the bit map A and the number of bits assigned to the bit map B.

In other words, the number of bits of the bit map A and the bit map B is required to meet the following conditions.

(number of bits of bit map A)×3+(number of bits of bit map B)×7≧(transmission rate in kbps)×(one period, 2.5 ms)

In order to reduce the delay time, the difference between the number of bits assigned to the bit map A and the number of bits assigned to the bit map B is minimized (the delay time assumes the worst value when the bit map B is minimum).

The specifications for this bit assignment are as follows (in this embodiment, an example of calculation of the bit assignment in which the transmission rate possible for the ADSL transmission path is determined as 64 kbps based on the S/N ratio measured during the training period as described above is considered).

.Number of bits of 1 $DMT$ symbol (before rate conversion) =

(transmission rate) ×

(transmission time) / (total number of symbols (except for $ISS$ (inverse sync symbol) and $SS$ (sync symbol))) =

64 kbps × 85 ms / 340 = 16 bits

. This example of calculation assumes that the number of bits of the bit map B is two.

.Number of bits of bit map $A$ =

((number of bits of 1 $DMT$ symbol) × (ten $DMT$ symbols) −

(total number of bits for seven bit maps $B$)) /

(3 symbols) = (16 × 10 − 2 × 7) / 3 = 48.67

Thus, the bit map A is equal to 49 bits.

.Dummy bits for the tenth bit map $B$ in each ten symbols (after rate conversion) =

(number of bits of bit map $A$) × (3 symbols) +

(number of bits of bit map $B$) × (7 symbols) −

(number of bits for 1 $DMT$ symbol) × (ten $DMT$ symbols) =

49 × 3 + 2 × 7 − 16 × 10 = 1 bit

Figure 5:
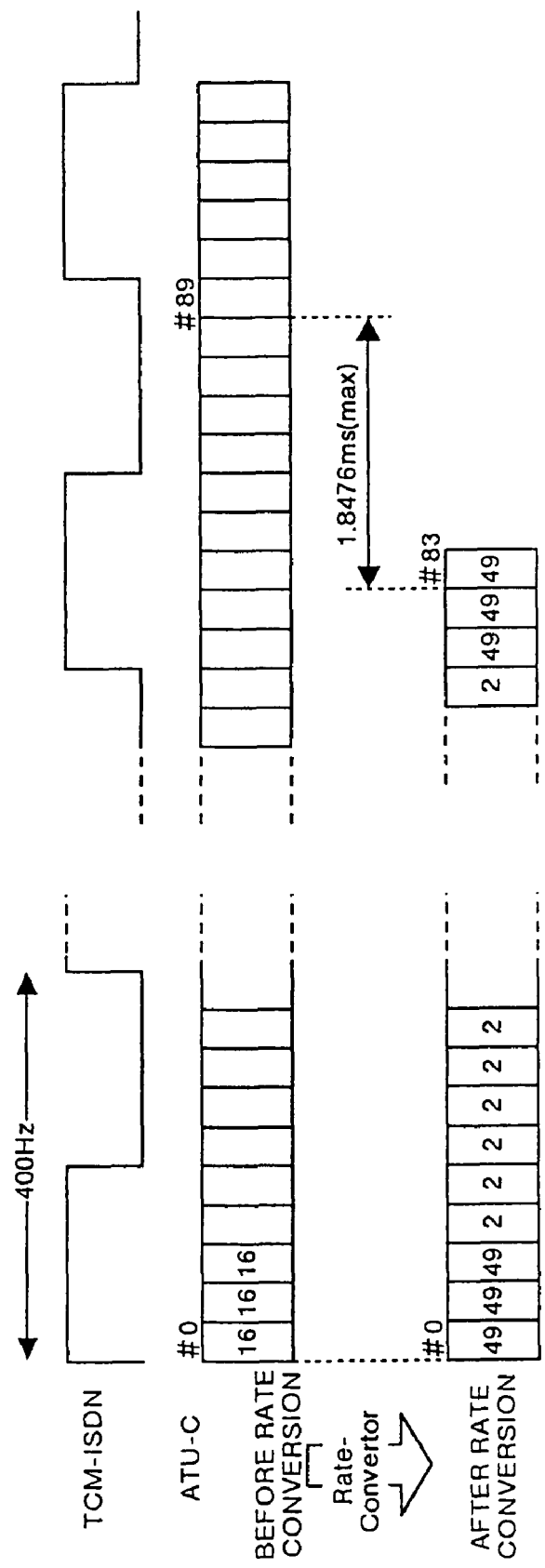
FIG. 5 is a diagram for explaining the transmission delay time in a dual bit map according to the present invention.

In this bit distribution, the delay time is given as follows (see FIG. 5).

.Transmission delay time (worst value is for symbol No. 83) =

(time required for storing total number of bits transmitted) −

(symbol No.) × (one symbol time) =

(total number of bits transmitted) / (transmission rate) −

(symbol No.) × (one symbol time) =

(160 × 8 + 49 × 3) / 64 kbps − 83 × (0.25 ms × 272/276) = 1.84759 ms

At the receiving end, on the other hand, the data sent in are converted into a uniform rate. In the process, it may happen that the data which otherwise should have arrived at uniform rate fail to do so due to the change in bit distribution at the time of transmission at the transmitting end (see FIG. 6). This delay time at the receiving end is maximum for symbol No. 152 in the case of FIG. 25.

.Receiving delay time (worst value is for symbol $No.$ 152) =

(symbol $No.$ + 1) × (one symbol time) −

(total number of bits transmitted) / (transmission rate) =

153 × 0.25 ms × 272/276 − (15 × 160 + 1 × 2) / 64 kbps = 0.16440 ms

In order not to interrupt the data after rate conversion due to this delay at the receiving end, a corresponding amount is offset using the buffer or the like. The sum 0.41077 ms of this offset (0.16440 ms) and one symbol time (0.24637 ms) constituting the processing delay of the discrete Fourier transform (DFT) in the receiving unit is determined as the receiving delay.

For the transmission rate of 64 kbps, therefore, the sum 2.25836 ms of the transmission delay time (1.84759 ms) and the receiving delay time (0.41077 ms) makes up the maximum delay time in the transmission and receiving equipment.

When changing the bit distribution by the rate convertor as described above, the data are output after being stored to some extent in the rate convertor at the transmitting end, and therefore the delay time occurs in the rate convertor. The longer the storage time, the longer the waiting time before the output, resulting in a longer delay time. In other words, with the increase in the data amount stored in one symbol after rate conversion, the delay time is lengthened.

Figure 7:
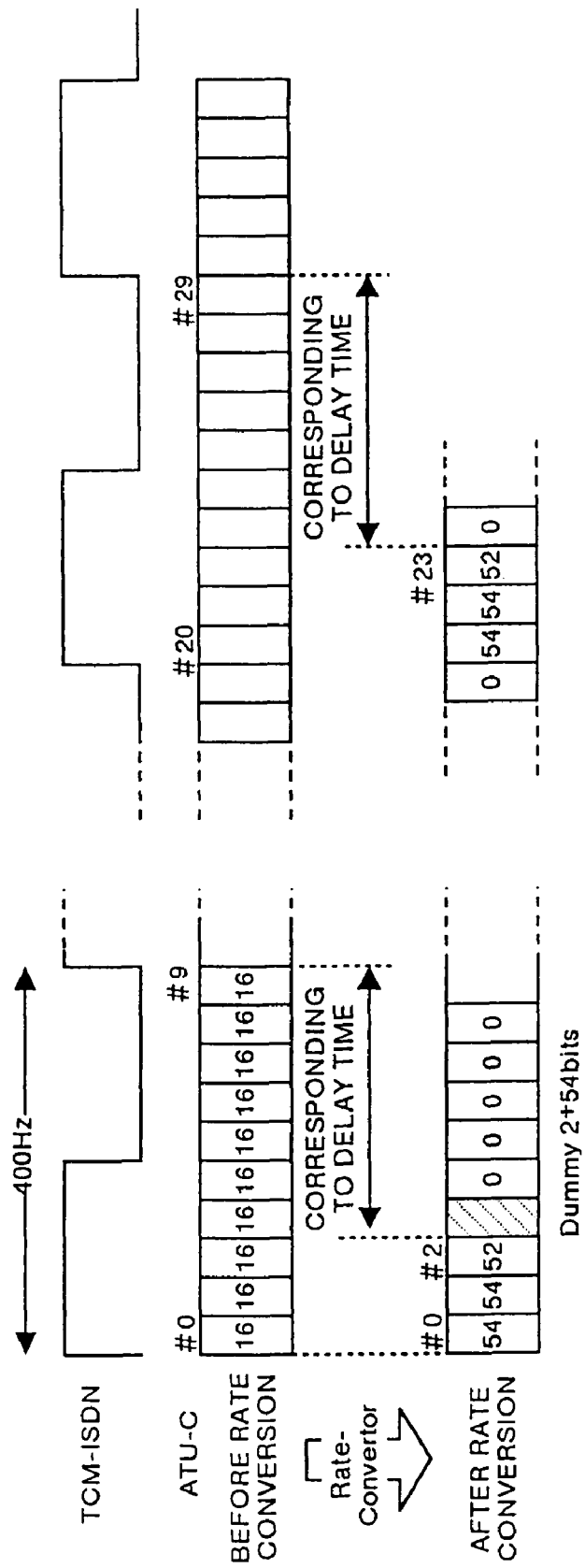
FIG. 7 is a diagram for explaining the transmission delay time.
Figure 25:
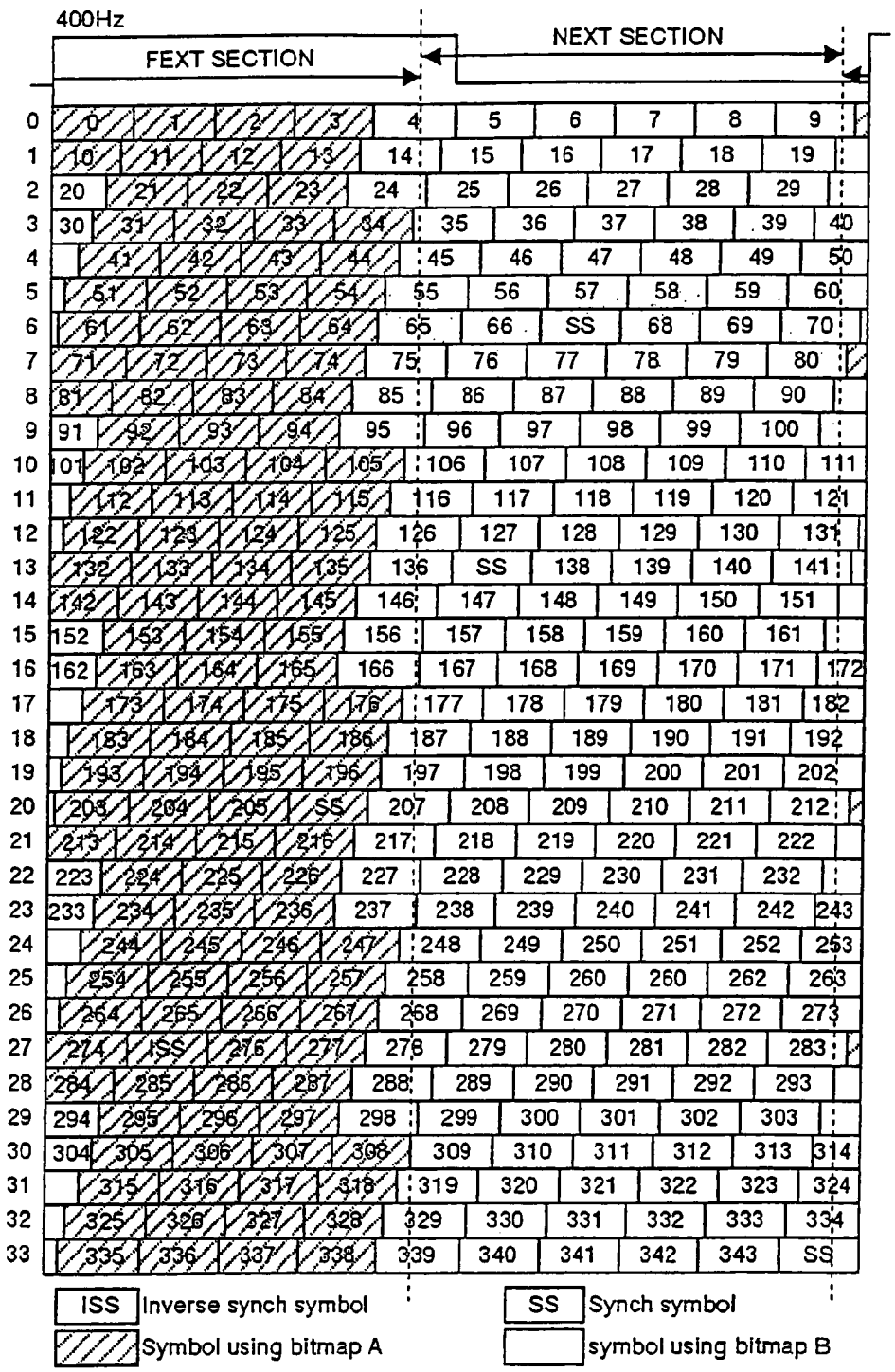
FIG. 25 is a diagram for explaining the structure of the hyperframe.

In the bit assignment described above using the single bit map, the data for one period before rate conversion is assigned to three symbols of the bit map A, and in the case where the bit maps A of four symbols are successive, the data are packed to the first three symbols, while dummy bits are inserted in the tail bit for transmission. Specifically, regardless of whether the bit map A has three or four symbols for one period, the data are assigned to the first three symbols. Therefore, the time required before the data is completely stored for one period is the same. For this reason, as shown in FIG. 7, for storing the data of the tenth symbol (#9, #29) before rate conversion in the third symbol (#2, #23) after rate conversion, it is necessary to wait for the data by the time corresponding to the difference between the last one of the ten symbols before rate conversion and the last one of the three symbols after rate conversion. The transmission delay time assumes the worst value when this difference is largest. The difference between the last one of the ten symbols before rate conversion and the last one of the three symbols after rate conversion becomes largest in the case where the symbols of the bit map A start earliest (symbol No. 81 in FIG. 25, for example) after the start of the FEXT section as shown in FIG. 25. This state is represented by the case in which four symbols can be inserted in the FEXT section (i.e. in the case where the bit map A involved is the bit map A4). The transmission delay time becomes worst when the bit map A is four symbols. As far as the delay time for the bit map A of four symbols can be improved, therefore, the worst value can also be improved, with the result that the transmission delay time of the communication system can be suppressed.

Specifically, when the bit maps A of four symbols are successive, dummy bits are distributed among the symbols of the four bit maps A. In this way, the amount of data stored in one symbol after rate conversion is reduced, and so is the time before the data are output, thereby improving the delay time in the case where the bit maps A of four symbols exist in one period, with the result that the transmission delay time can be suppressed. In short, the whole FEXT section suitable for transmission can be used uniformly for data transmission.

Specifically, in the communication system according to the present invention, by distributing the data uniformly over the data transmission time (corresponding to the FEXT section described above, for example) constituting the time suitable for data transmission in one period, the amount of data stored in one symbol after rate conversion is reduced and so is the time before the data are output thereby to suppress the transmission delay time. This is also the case with the dual bit map.

An example of calculation for determining the bit assignment for the single bit map using only the bit map A according to the present invention will be described below. The bit assignment is conducted by rate convertors 47, 48 shown in FIG. 21 like the conventional communication system.

Figure 8:
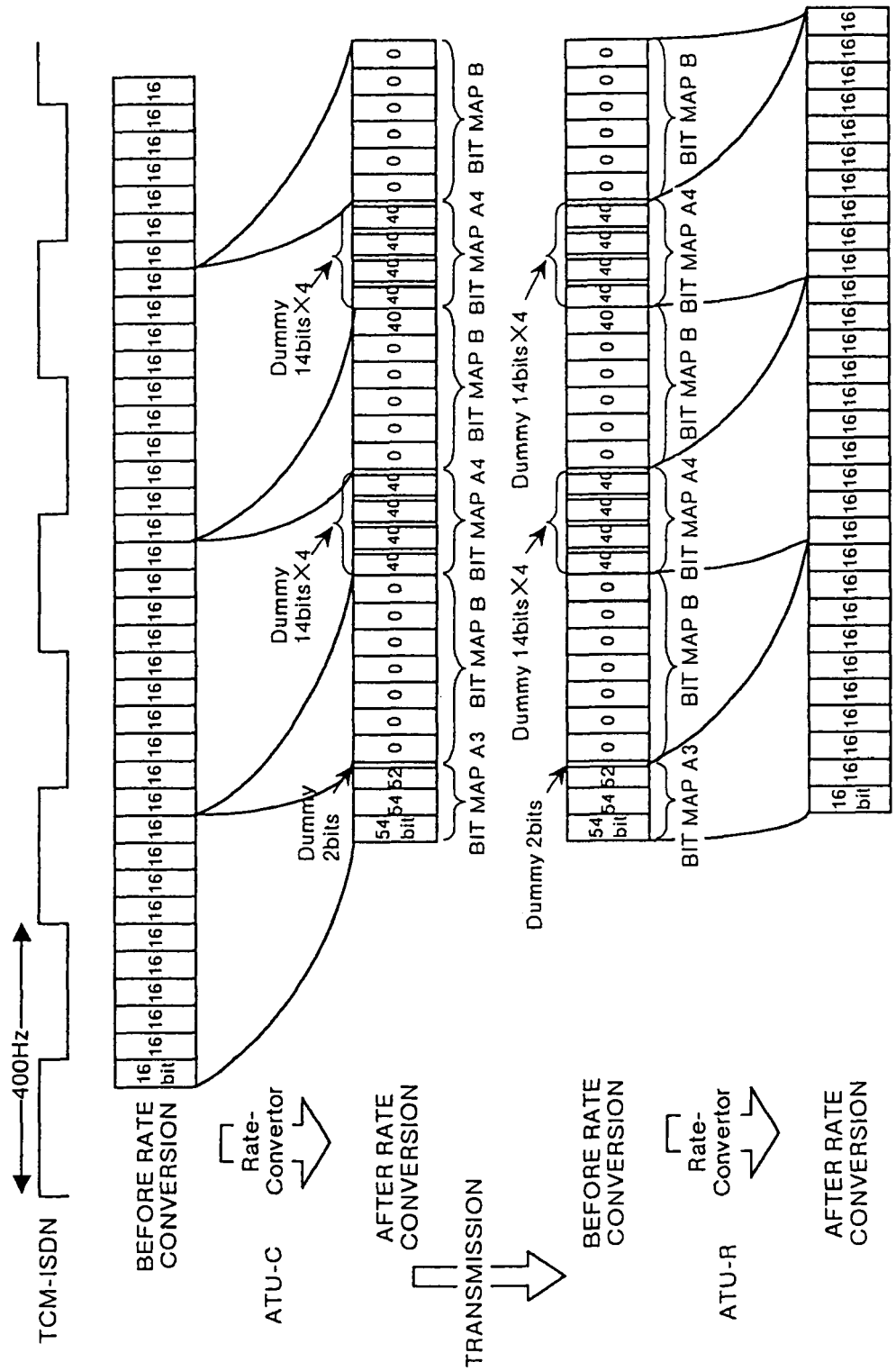
FIG. 8 is a diagram for explaining the bit assignment for a communication system according to the present invention.

FIG. 8 shows an outline of the bit assignment. Bits are assigned in such a manner that uniform data of one period can all be transmitted during the data transmission time which is the time (corresponding to the FEXT section described above) suitable for data transmission in the particular period. Also, dummy data are inserted in the portion of the data transmission time to which the data could not be assigned.

Bits are assigned, for example, in such a manner that one period (2.5 ms) of data, i.e. ten DMT symbols of data are inserted in three symbols of the bit map A (symbols that can be fully inserted in the data transmission time), and dummy bits are inserted in the bits, if any, in the third symbol of the bit map A to which data were not distributed. Further, in the case where the bit map A has four successive symbols, on the other hand, data of ten DMT symbols are uniformly distributed among the four symbols of the bit map A and dummy bits are inserted in the portion of each symbol of the bit map A where the data were not distributed. The bit map A having three symbols in a period is mentioned as the bit map A3, and the bit map A having four symbols in a period is mentioned as the bit map A4.

Specifically, the number of bits of the bit map A3 and the bit map A4 to which the data are distributed is required to meet the following conditions.

(Number of bits of data distributed to bit map A3)×3 ≧ (transmission rate in kbps)×(one period i.e. 2.5 ms)

(Number of bits of data distributed to bit map A4)×4 ≧ (transmission rate in kbps)×(one period i.e. 2.5 ms)

The specifications for this bit distribution are as follows (in this embodiment, an example of calculation of the bit assignment for the possible data transmission rate of 64 kbps for the ADSL transmission path as determined based on the S/N ratio measured during the training period as described above is considered).

.Number of bits of 1 DMT symbol (before rate conversion) =

(transmission rate) ×

(transmission time)/(total number of symbols (except for ISS (inverse sync symbol) and SS (sync symbol))) =

64 kbps × 85 ms/340 = 16 bits

.Number of bits distributed to bit map A =

(number of bits of 1 DMT symbol) ×

(ten DMT symbols)/(3 symbols) = 16 × 10/3 = 53.33

Thus, the bit map A is equal to 54 bits. That is to say, the number of bits of the data distributed to the bit map A3 is 54.

.Dummy bits for third symbol of bit map A3 =

(number of bits distributed to bit map A3) × (3 symbols) −

(number of bits for 1 DMT symbol) × (ten DMT symbols) =

54 × 3 − 16 × 10 = 2 bits

.Number of bits of data distributed in bit map A4 =

(number of bits of 1 DMT symbol) ×

(10 DMT symbols)/(4 symbols) = 16 × 10/4 = 40

.Dummy bits for each symbol of bit map A4 =

Figure 9:
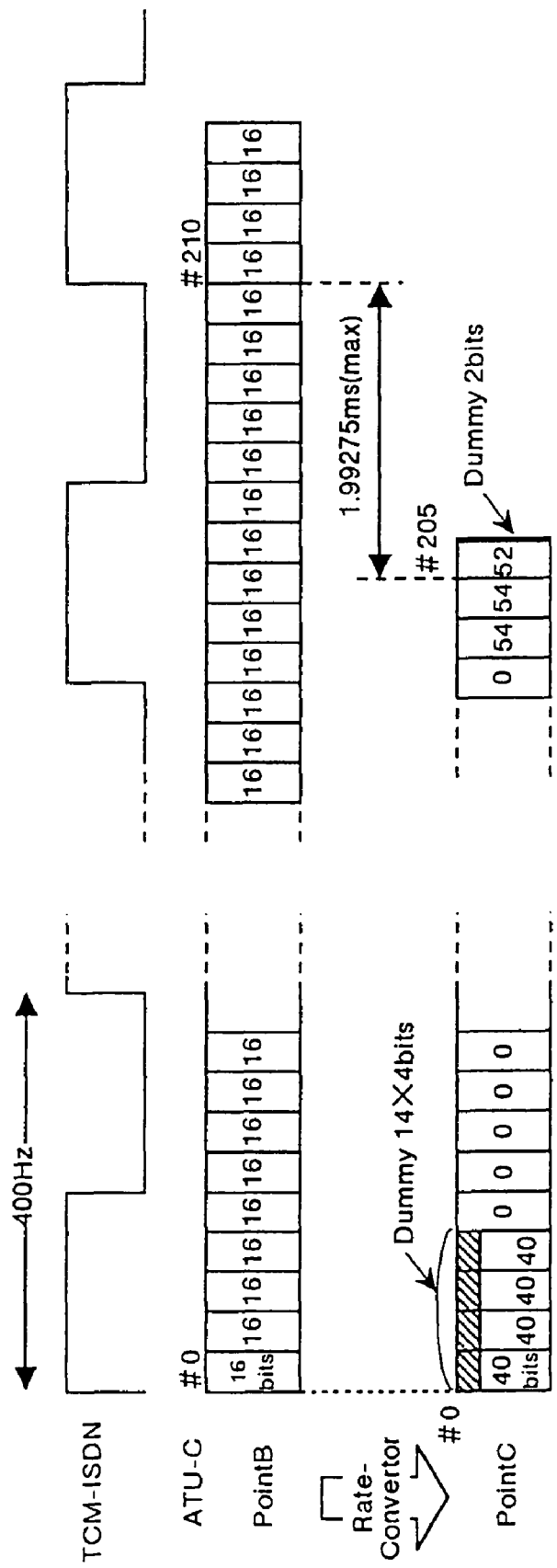
FIG. 9 is a diagram for explaining the transmission delay time in a single bit map according to the present invention.

(number of bits of bit map A) − (number of bits of data distrubuted to bit map A4) = 54 − 40 = 14 bits In this bit distribution, the delay time is given as follows (see FIG. 9).

.Transmission delay time (worst value is for symbol No. 205) =

(time required for storing total number of bits transmitted) −

(symbol No.) × (one symbol time) =

-continued (total number of bits transmitted)/(transmission rate) −

(symbol *No.*) × (one symbol time) =

21 × 160/64 kbps − 205 × 0.25 ms × 272/276 = 1.99275 ms

Figure 3:
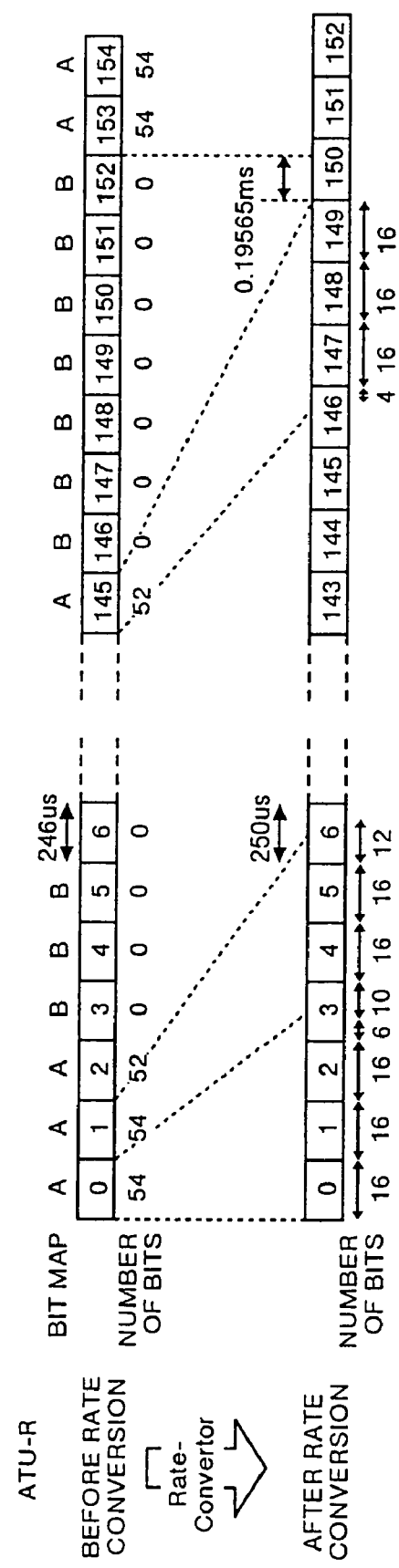
FIG. 3 is a diagram for explaining the receiving delay time in a single bit map according to the present invention.

At the receiving end, on the other hand, the data sent in are converted into a uniform rate in a manner similar to FIG. 3. In this process, it may happen that the data which otherwise should have arrived at uniform rate may fail to arrive so due to the change in bit distribution at the time of transmission at the transmitting end. This delay time at the receiving end is maximum for symbol No. 152 in the case of FIG. 25.

.Receiving delay time (worst value is for symbol *No.* 152) =

(symbol *No.* +1) × (one symbol time) −

(total number of bits transmitted)/(transmission rate) =

153 × 0.25 ms × 272/276 − 15 × 160/64 kbps = 0.19565 ms

In order not to interrupt the data after rate conversion due to this delay at the receiving end, a corresponding amount is offset using the buffer or the like. The sum 0.44203 ms of the offset value (0.19565 ms) and one symbol time (0.24637 ms) constituting the processing delay in the discrete Fourier transform (DFT) is determined as the receiving delay.

Thus, for the transmission rate of 64 kbps, the sum 2.43478 ms of the transmission delay time (1.99275 ms) and the receiving delay time (0.44203 ms) makes up the maximum delay time in the transmission and receiving units. It is thus clear that the delay time is suppressed as compared with the previously determined transmission delay time (2.05072 ms), the receiving delay time (0.44203 ms) and the maximum delay time (2.49275 ms) in the transmission and receiving units.

The following is an example of calculation for determining the bit assignment for the dual bit map using both the bit map A and the bit map B. The bit assignment is conducted by rate convertors 47, 48 shown in FIG. 21 like the conventional communication system.

Figure 10:
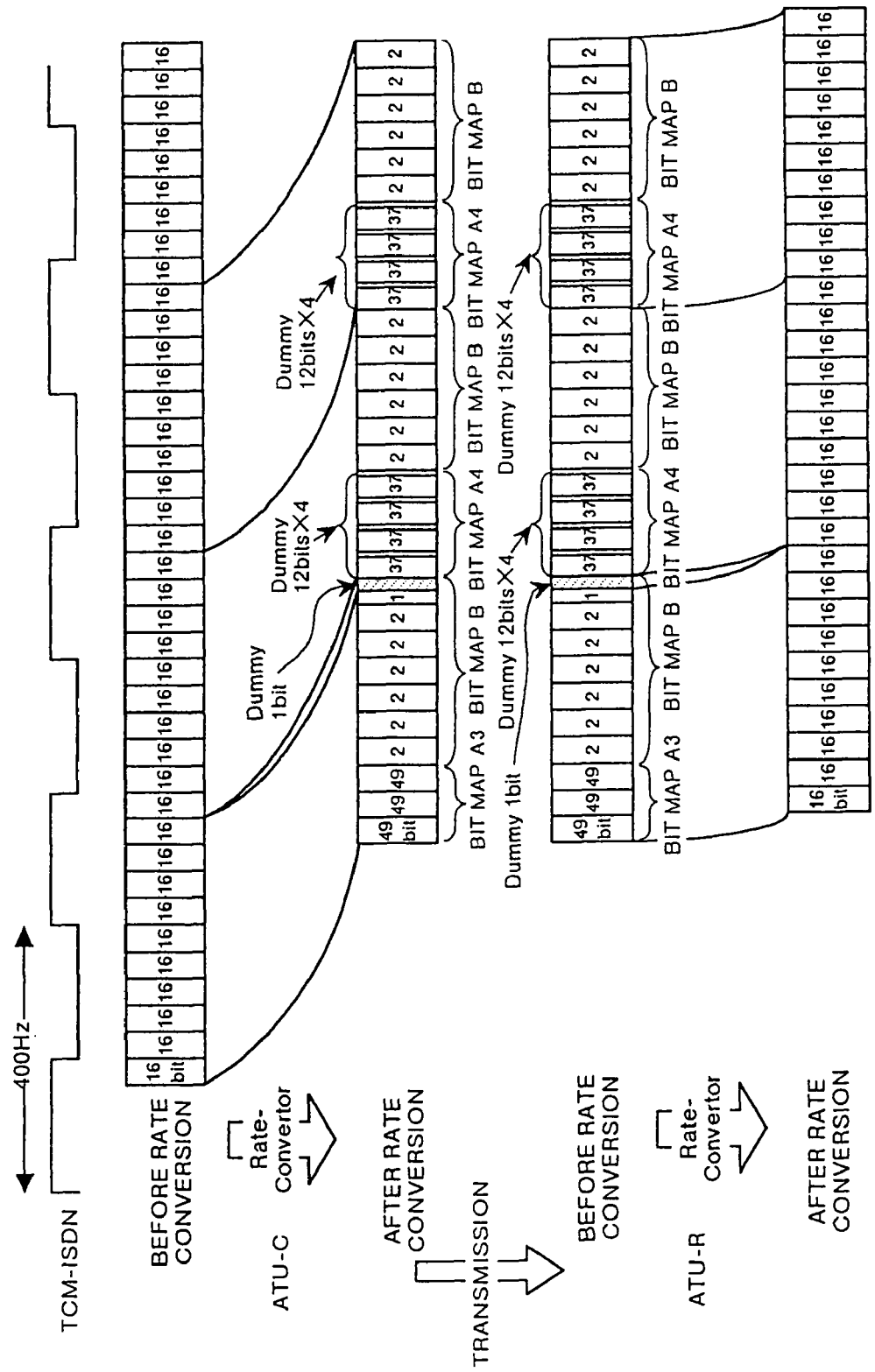
FIG. 10 is a diagram for explaining the bit assignment for a communication system according to the present invention.

FIG. 10 shows an outline of the bit assignment. In order to suppress the delay, bits are assigned in such a manner that uniform data of one period can be transmitted during the data transmission time which is the time (corresponding to the FEXT section described above, for example) suitable for data transmission and the quasi-data transmission time constituting the time other than the data transmission time (corresponding to the NEXT section described above, for example) in the particular period. Further, dummy data are inserted and transmitted in the portion of the data transmission time and the quasi-data transmission time to which the data were not be assigned.

Bits are assigned, for example, in such a manner that one period (2.5 ms) of data, i.e. ten DMT symbols of data (before rate conversion) are inserted in three symbols of the bit map A (symbols that can be fully inserted in the data transmission time) and seven symbols of the bit map B (quasi-data transmission time), and dummy bits are inserted in the portion of the bit map A and the bit map B not assigned the data. Further, in the case where the bit map A has four successive symbols, on the other hand, the ten DMT symbols of data (before rate conversion) are uniformly distributed over the four symbols of the bit map A after being distributed over the six symbols of the bit map B. Further, dummy bits are inserted in the portion of the bit map A and the bit map B not assigned the data. In this process, the amount of delay can be reduced by minimizing the difference between the number of bits assigned to the bit map A and the number of bits assigned to the bit map B. In this case, the bit map A having three symbols for one period is mentioned as the bit map A3, and the bit map A having four symbols for one period is mentioned as the bit map A4.

In other words, the number of bits of the bit map A and the bit map B is required to meet the following conditions.

(Number of bits of data distributed to bit map A3)×3+
(number of bits of bit map B)×7≧(transmission
rate in kbps)×(one period 2.5 ms)

(Number of bits of data distributed to bit map A4)×4+
(number of bits of bit map B)×6≧(transmission
rate in kbps)×(one period 2.5 ms)

.For reducing the delay time, the difference between the number of bits assigned to the bit map A and the number of bits assigned to the bit map B is minimized (the delay time assumes the worst value when the bit map B is minimum).

Figure 11:
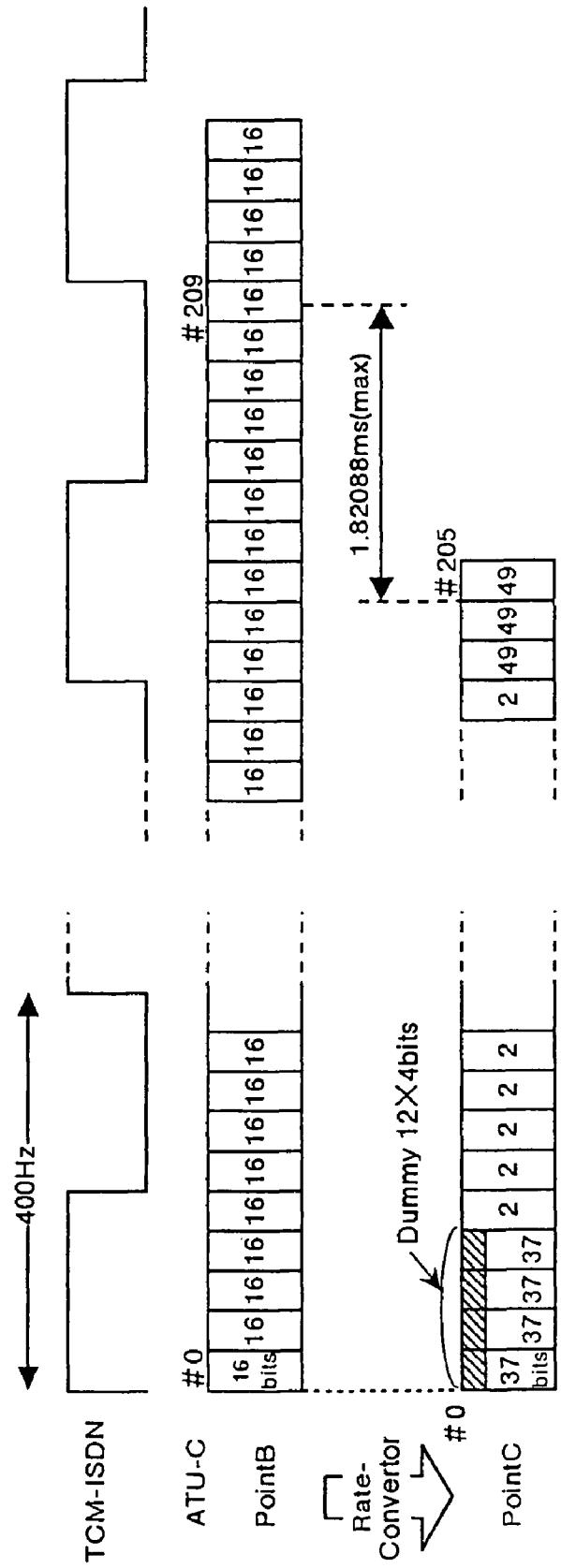
FIG. 11 is a diagram for explaining the transmission delay time in a dual bit map according to the present invention.

In this bit distribution, the delay time is given as follows (see FIG. 11).

.Transmission delay time (worst value is for symbol *No.* 205) =

(time required for storing total number of bits transmitted) −

(symbol *No.*) × (one symbol time) =

(total number of bits transmitted)/(transmission rate) −

(symbol *No.*) × (one symbol time) =

(160 × 20 + 2 + 49 × 3)/64 kbps − 205 × (0.25 ms × 272/276) =

1.82088 ms

Figure 6:
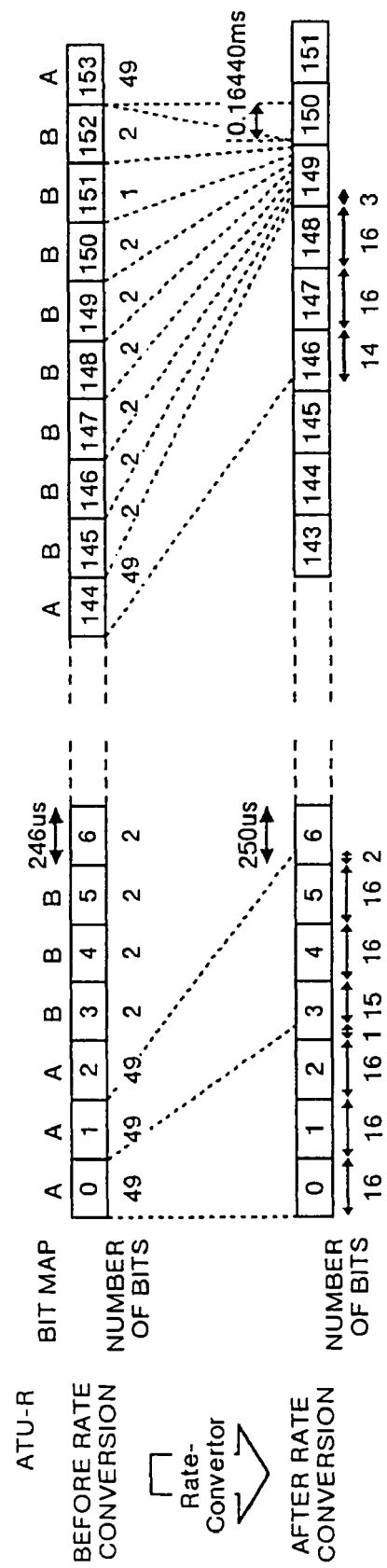
FIG. 6 is a diagram for explaining the receiving delay time in a dual bit map according to the present invention.

At the receiving end, on the other hand, the data sent in are converted into a uniform rate in a manner similar to FIG. 6. In this process, it may happen that the data which otherwise should have arrived at uniform rate fail to arrive so due to the change in the bit distribution at the time of transmission at the transmitting end (see FIG. 12). This delay time at the receiving end is maximum for symbol No. 152 in the case of FIG. 25.

.Receiving delay time (worst value for symbol *No.* 152) =

(symbol *No.* +1) × (one symbol time) −

(total number of bits transmitted)/(transmission rate) =

153 × 0.25 ms × 272/276 − (15 × 160 + 2)/64 kbps = 0.16440 ms

In order not to interrupt the data after rate conversion due to this delay at the receiving end, a corresponding amount is offset using the buffer or the like. As a result, the sum 0.41077 ms of the offset (0.16440 ms) and one symbol time (0.24637 ms) constituting the processing delay of the discrete Fourier transform (DFT) in the receiving unit is determined as the receiving delay.

For the transmission rate of 64 kbps, therefore, the sum 2.23165 ms of the transmission delay time (1.82088 ms) and the receiving delay time (0.41077 ms) makes up the maximum delay time in the transmission and receiving equipment.

Thus, it is clear that the delay time is suppressed as compared with the previously determined transmission delay time (1.84759 ms), the receiving delay time (0.41077 ms) and the maximum delay time (2.25836 ms) in the transmission and receiving units.

As described above, by distributing the data uniformly over each of the data transmission time (corresponding to the FEXT section described above, for example) constituting the time suitable for data transmission in a period and the quasi-data transmission time (corresponding to the NEXT section described above, for example) constituting the time other than the data transmission time in the period, the data amount stored in one symbol after rate conversion is reduced and the transmission delay time can be suppressed.

This embodiment has been explained with reference to the case in which the transmissible data rate on the ADSL transmission path is determined as 64 kbps based on the S/N ratio measured during the training period. The delay time, however, can be suppressed in similar fashion for different data rates.

Also, the functions indicated by use of the functional configuration diagram in the foregoing description can be realized by either H/W or S/W.

Further, what is necessary is to distribute the data uniformly over the data transmission time constituting the time suitable for data transmission in a period, and dummy bits can be inserted chronologically in the portion before the symbols but not necessarily in the portion shown in FIG. 8 and FIG. 10.

In the bit distribution described above, the delay time can be suppressed, but the transmission efficiency is deteriorated due to the wasteful transmission of dummy bits. In the case where the conventional single bit map is used at the data rate of 64 kbps, for example, the bit map A is 44 bits, but in the aforementioned bit distribution (hereinafter called the low transmission delay mode), the bit map A requires 54 bits.

Figure 20:
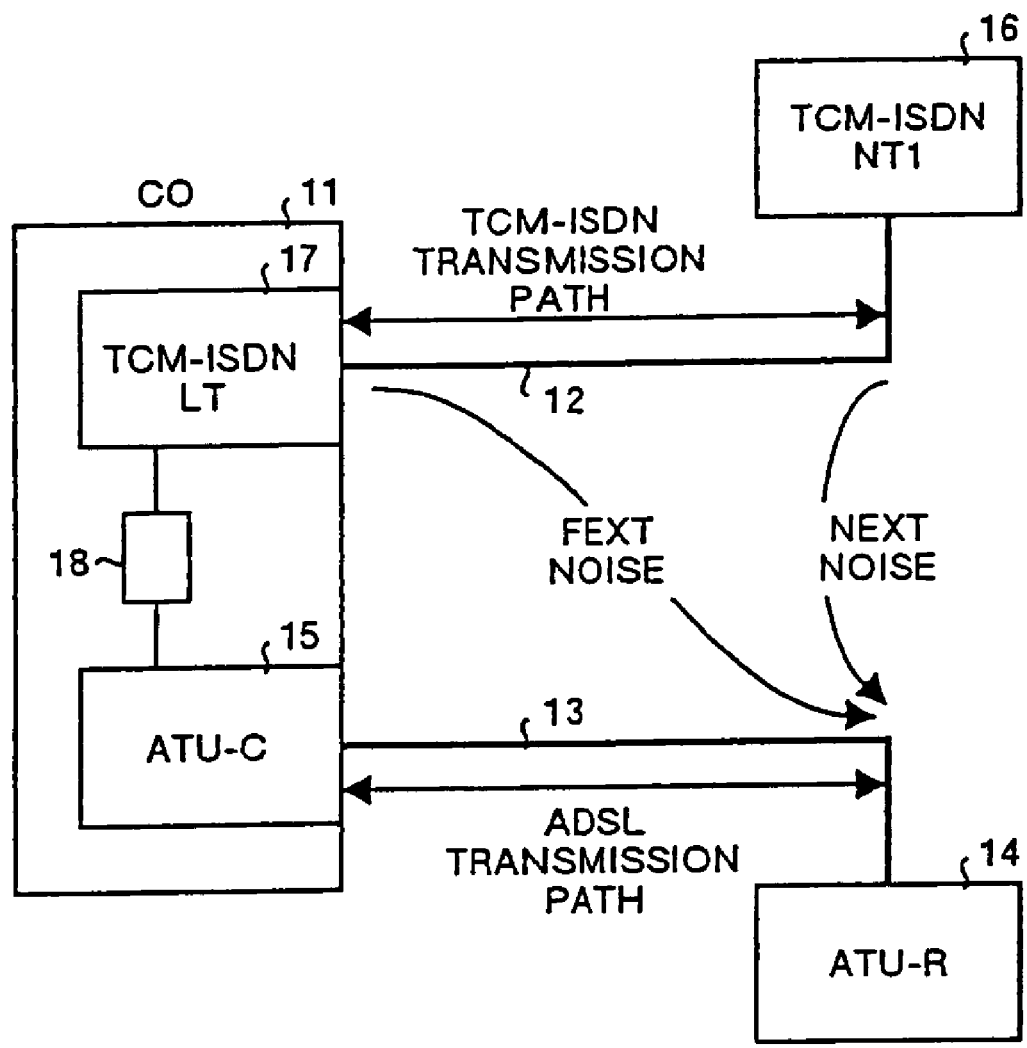
FIG. 20 is a diagram showing the behavior of the interference noises between the transmission paths.

For transmitting all the bits of the bit map A as valid bits, for example, the low transmission delay mode requires the data transmission capacity of 54 bits×126 (number of bit maps A in hyperframe)/85 ms=80 kbps is required for the ADSL transmission path 13 (FIG. 20).

Among the data of about 80 kbps, however, the actual effective transmission data is 64 kbps, and therefore 80 kbps−64 kbps=16 kbps is the transmission loss in the ADSL transmission path 13.

In the mode (hereinafter referred to as the normal mode) other than the low transmission delay mode, however, the bit map A has 44 bits, and therefore the data transmission capacity of 44 bits×126 (number of bit maps A in hyperframe)/85 ms=65 kbps is required, and therefore the transmission loss shall be 65 kbps−64 kbps=1 kbps.

Thus, the transmission loss is less than the same in the low transmission delay mode.

As described above, in the low transmission delay mode with a small delay, the transmission loss is generated by inserting dummy bits. Depending on the type of the transmission data, however, the suppression of the delay time is not necessarily required.

In view of this, the present invention is intended to multiplex and transmit the data requiring the suppression of the delay time and the data not requiring the suppression of the delay time in coexistence in such an efficiently manner that the transmission loss is prevented by assigning the data of normal mode also to the portion of the dummy bits generated in the low transmission delay mode. An embodiment of the present invention will be described below.

Figure 22:
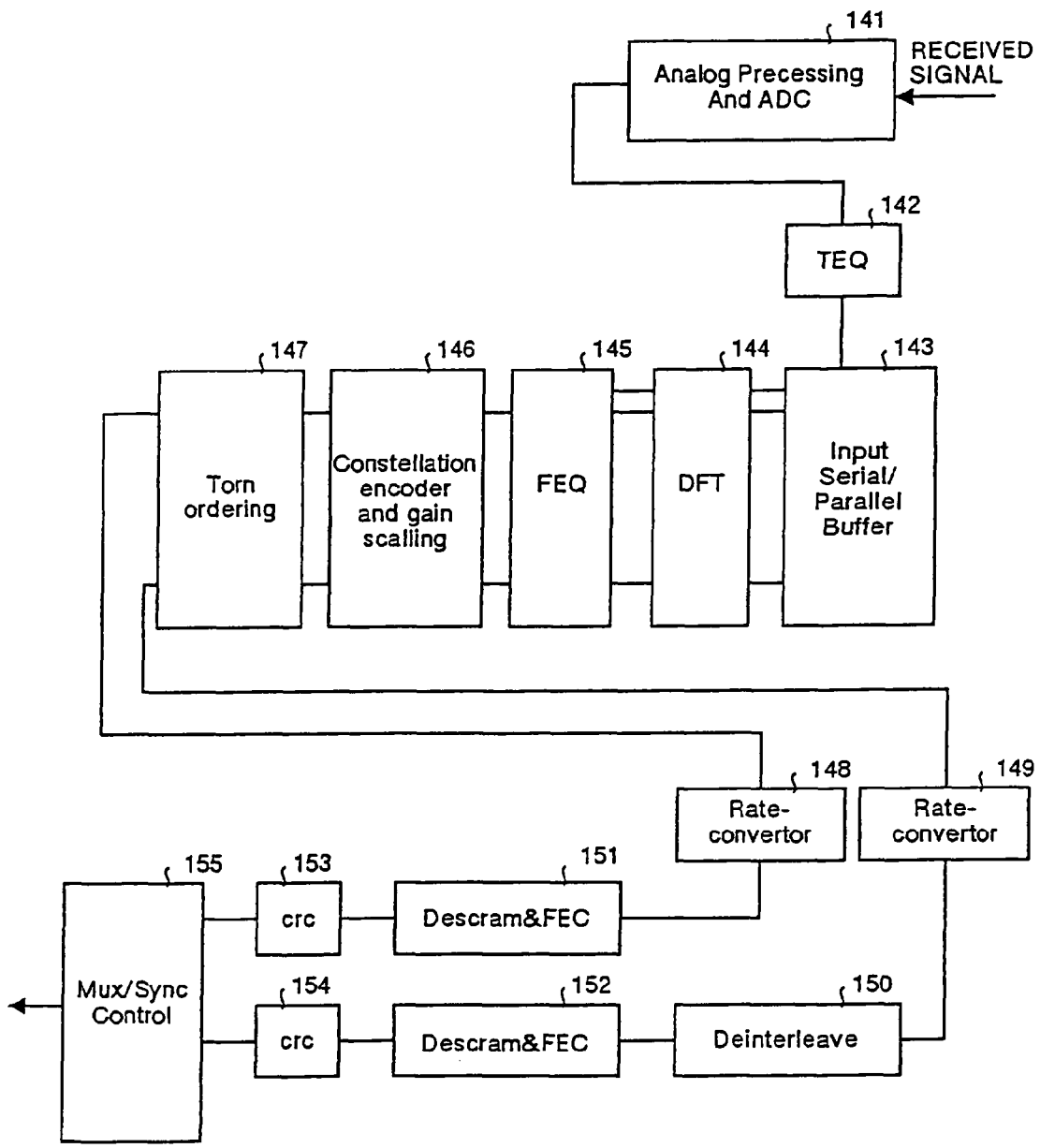
FIG. 22 is a functional configuration diagram showing the receiving function of the ADSL terminal equipment.
Figure 23:
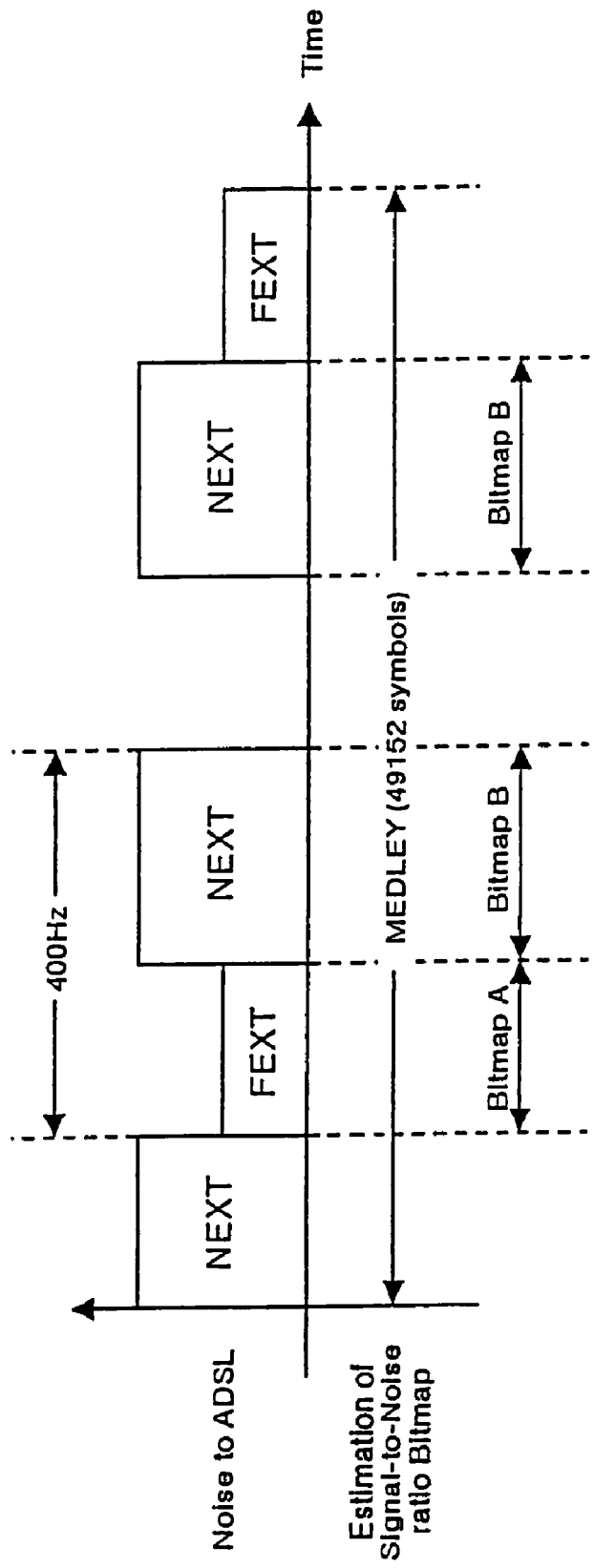
FIG. 23 is a diagram for explaining the correspondence between the FEXT section and the NEXT section and the bit map.
Figure 24:
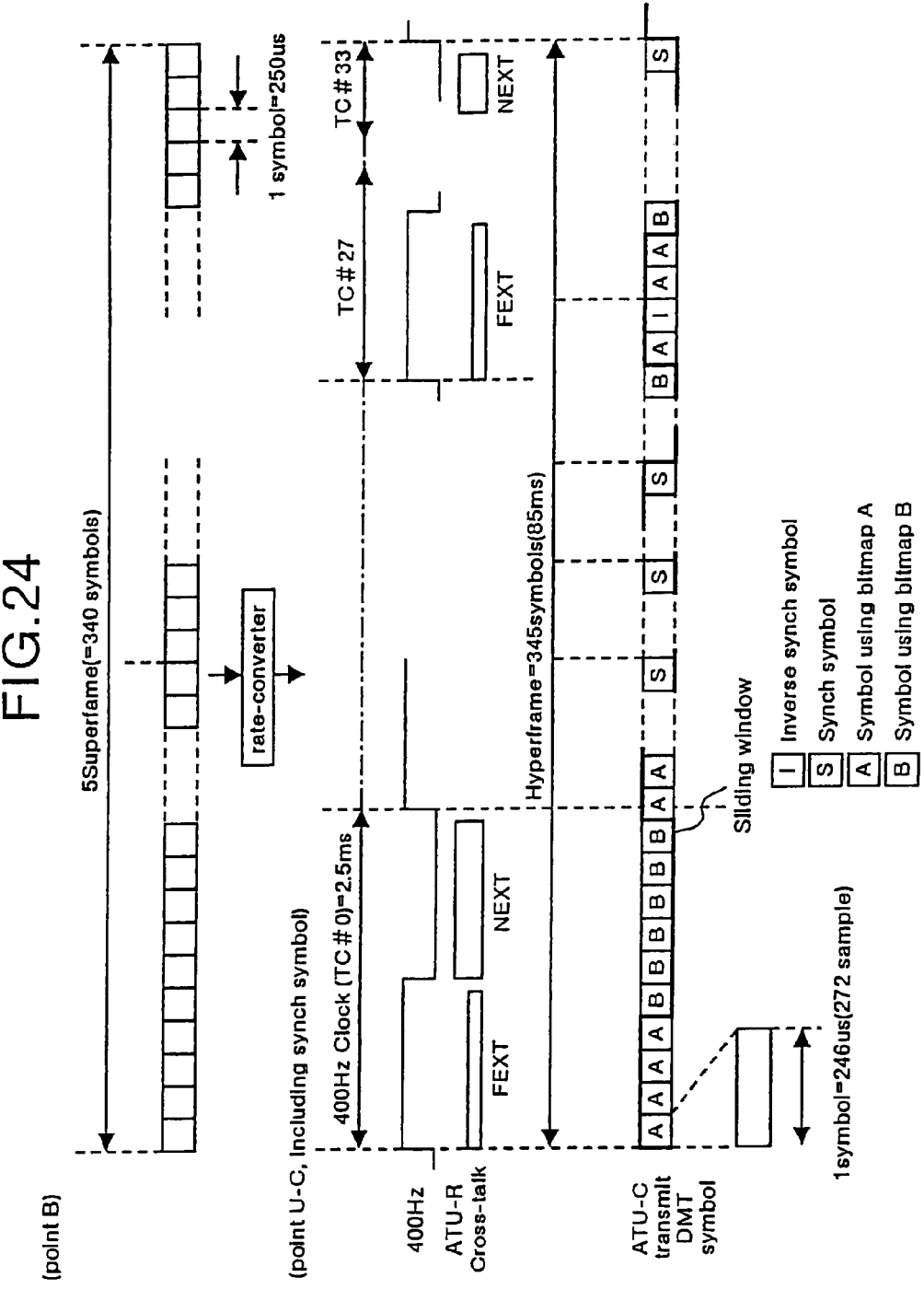
FIG. 24 is a diagram for explaining the distribution of bit maps according to the prior art.

The ADSL office equipment (FIG. 21) constituting the source of data transmission from the ADSL office equipment to the ADSL terminal equipment has two routes from the multiplex/sync control 41 to the tone ordering 49. One is an interleaved data buffer route containing the interleave 46, and the other is a fast data buffer route not containing the interleave 46. The delay in the interleaved data buffer route involving the interleave operation is greater. Similarly, the ADSL terminal equipment (FIG. 22) constituting the receiving end also has two routes. This configuration makes it possible to use the interleaved route and the route not interleaved, for different purposes.

In transmitting data from the ADSL office equipment to the ADSL terminal equipment, how to transmit the data is determined by the initialization process. An example of the table transmitted at the time of initialization is shown in FIG. 12. In FIG. 12, m12, m13 are indicated as "Reserved for future use". According to the present invention, this portion is used as a flag indicating which is selected, low transmission delay mode or normal mode, in the fast data buffer route and the interleaved data buffer route as shown in FIG. 13. m12, m13 are defined as follows.

When m12=0, the fast data buffer route is processed in normal mode.
When m12=1, the fast data buffer route is processed in low transmission delay mode.
When m13=0, the interleaved data buffer route is processed in normal mode.
When m13=1, the interleaved data buffer route is processed in low transmission delay mode.

Figure 14:
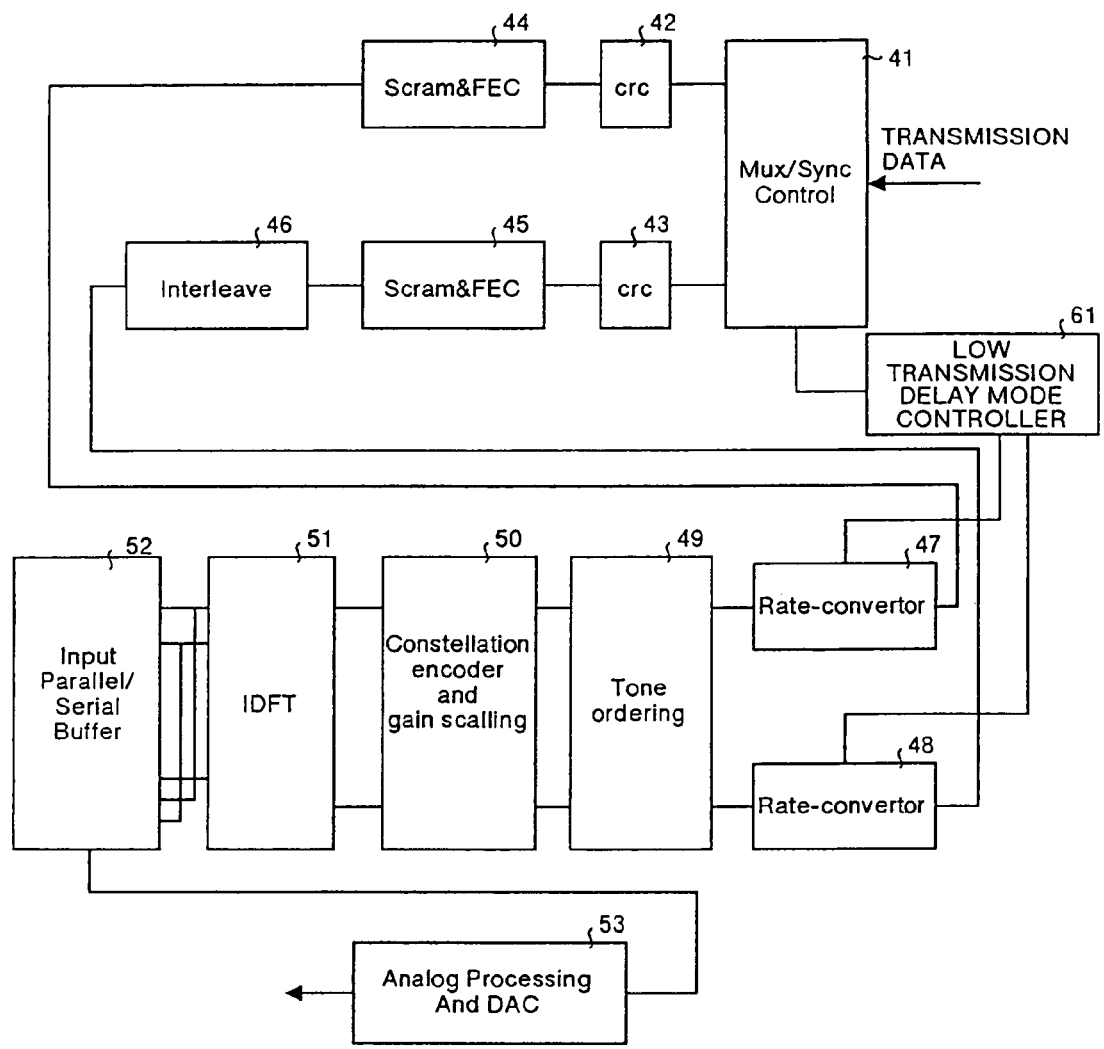
FIG. 14 is a functional configuration diagram showing the transmission function of the ADSL office equipment according to the present invention.
Figure 15:
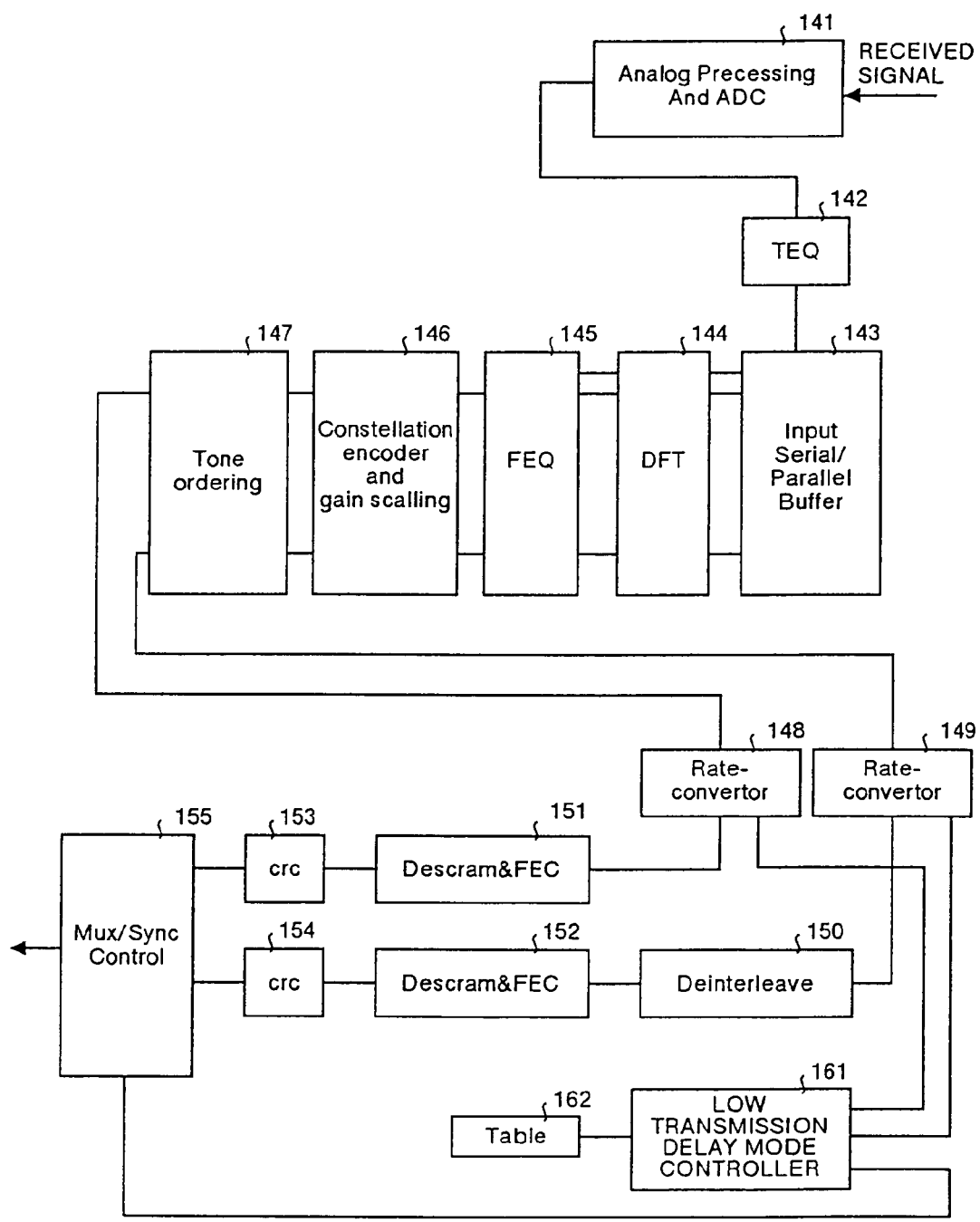
FIG. 15 is a functional configuration diagram showing the receiving function of the ADSL terminal equipment according to the present invention.

With reference to FIG. 14 and FIG. 15, an explanation will be given of the operation performed in response to a request received from an upper-level layer to transmit the audio system data (first data), on which the effect of transmission delay is desirably minimized, through the fast data buffer route in low transmission delay mode on the one hand and to transmit the internet data (second data), which emphasizes the data transmission rate rather than the delay, through the interleaved data buffer route in normal mode on the other hand. FIG. 14 is a functional configuration diagram showing the configuration of the transmission system of the ADSL office equipment, and FIG. 15 is a functional configuration diagram showing the configuration of the receiving system of the ADSL terminal equipment. In FIG. 14, numeral 61 designates low transmission delay mode controller which controls the route selection between the fast data buffer route and the interleaved data buffer route and the mode selection between the low transmission delay mode and the normal mode. In FIG. 15, numeral 161 designates low transmission delay mode controller which controls the route selection between the fast data buffer route and the interleaved data buffer route and the selection of the low transmission delay mode, and numeral 162 designates a table delivered between the transmitting and receiving ends at the time of initialization process.

Assume that the ADSL office equipment 15 has received a request from an upper-level layer to transmit the audio data through the fast data buffer route in low transmission delay mode and the internet data through the interleaved data buffer route in normal mode. First, m12 is initialized to 1 and m13 is initialized to 0. The table shown in FIG. 13 is then transmitted to the ADSL terminal equipment 16. The contents of the table transmitted by the ADSL terminal equipment 16 are reflected in the table 162 (FIG. 15).

Then, in the ADSL office equipment 15, the low transmission delay mode controller 61 (FIG. 14) controls the operation in such a manner as to transmit the audio data through the fast data buffer route and the internet data through the interleaved data buffer route. The audio data is then transmitted through the cyclic redundancy check 42, the scramble and forward error correction 44 to the rate convertor 47. On the other hand, the internet data is transmitted through the cyclic redundancy check 43, the scramble and forward error correction 45 and the interleave 46 to the rate convertor 48.

The low transmission delay mode controller 61 controls the rate convertors 47, 48 in such a manner as to process the audio data in low transmission delay mode and the internet data in normal data. In accordance with this control, the rate convertors 47, 48 process and transmit the respective data. The bit distribution between the audio data (first data) and the internet data (second data) is determined, after which the respective data are multiplexed by the tone ordering 49, and transmitted to the ADSL terminal equipment 16 through the analog processing and D/A converter 53 and the ADSL transmission path 13.

In the ADSL terminal equipment 16 that has received the audio data and the internet data, on the other hand, the low transmission delay mode controller 161 controls the audio data to be transmitted through the fast data buffer route and the internet data to be transmitted through the interleaved data buffer route with reference to the table 162 (FIG. 15) reflecting the contents transmitted at the time of initialization. The audio data are transmitted to the rate convertor 148 through the discrete Fourier transform 144, etc. and the internet data to the rate convertor 149.

Because m12 is set to 1 and m13 is set to 0, the low transmission delay mode controller 161 controls the rate convertors 148, 149 in such a manner as to process the audio data in low transmission delay mode and the internet data in normal mode. In accordance with this control operation, the rate convertors 148, 149 process and transmit the data.

After that, the audio data are transmitted through the descramble and forward error correction 151, the cyclic redundancy check 153 and the multiplex/sync control 155, and the internet data are transmitted through the deinterleave 150, the descramble and forward error correction 152, the cyclic redundancy check 154 and the multiplex/sync control 155.

As described above, in the case where the audio data and the internet data coexist during transmission, the mode of transmission of the audio data and the internet data is switched between the low transmission delay mode and the normal mode. Also, the data in normal mode are distributed to the portion of the dummy bits generated in low transmission delay mode. Thus, the audio data can be transmitted utilizing a communication method having a lower transmission delay, while the internet data can be transmitted utilizing a communication method having a lower transmission loss. Further, the transmission free of transmission loss is possible, and therefore the disadvantage that the transmission loss is generated in low transmission delay mode can be obviated.

Suppose, for example, a home environment in which one ISDN telephone (audio data of 64 kbps) or equivalent and one internet access unit (internet data 512 kbps) are used at the same time. An explanation will be given of the case in which the audio data of 64 kbps are transmitted in low transmission delay mode and the internet data of 512 kbps in normal mode using the single bit map according to the present invention, i.e. the case in which all the audio data for one period are assigned to the data transmission time for the period and the internet data for a predetermined period (corresponding to one hyperframe) are assigned to the portion of the data transmission time of one hyperframe not assigned the audio data including the dummy bits (see FIG. 16). The operation is similar to the case described above.

A calculation example is shown below, in which the maximum number of bits available in the FEXT section and the maximum number of bits available in the NEXT section determined based on the S/N ratio measured during the training period are 480 bits and 0 bit, respectively, and the audio system data of 64 kbps (one ISDN telephone, for example) is transmitted through the fast data buffer route in low transmission delay mode, and the internet data of 512 kbps (one internet access unit, for example) through the interleaved buffer route in normal mode.

(Number of bits per symbol of audio data before rate conversion) =

(transmission rate) ×

(transmission time)/(total number of symbols (except for ISS (inverse sync symbol) and SS (sync symbol))) =

64 kbps × 85 ms/340 = 16 bits.

The bits are distributed in such a manner that the audio data using the fast data buffer route of ten symbols can be transmitted by the symbols (bit map A) of the FEXT section. In this case, a bit map A, if three are included in one period, is called the bit map A3, and if four are included in one period, called the bit map A4.

.In the case where one period contains three symbols of bit map A (Audio data for ten symbols) = 16 bits × 10 symbols = 160 bits (Number of bits of audio data to be transmitted with bit map A3) =

(audio data for ten symbols)/3 symbols = 160/3 = 53.33

Thus, the number of bits of the audio data to be transmitted with the bit map A3 is determined as 54.

(Dummy bits of third bit map A3 in each period) =

(number of bits of audio data to be transmitted with bit map A3) × (3 symbols) −

(number of bits for 1 DMT symbol) × (ten DMT symbols) =

54 × 3 − 16 × 10 = 2 bits (Number of bits of audio data to be transmitted with bit map A4) =

(audio data for ten symbols)/4 symbols = 160/4 = 40

Thus, the number of bits of the audio data to be transmitted with the bit map A4 is determined as 40 bits, and the internet data using the interleaved buffer route are assigned to the unused portion of the bit map A.

$$
\begin{aligned}
&\text{(Unused portion of bit map } A \text{ in one hyperframe)} = \\
&\quad \text{(Unused portion of bit map } A3 \text{ in one hyperframe)} + \\
&\quad \text{(Unused portion of bit map } A4 \text{ in one hyperframe)} = \\
&\quad \text{(((maximum number of bits available in } FEXT \text{ section)} - \\
&\quad \quad \text{(number of bits of audio data to} \\
&\quad \quad \text{be trasmitted with bit map } A3) \times \\
&\quad \quad \text{(number of bit maps } A3 \text{ in one hyperframe)} + \\
&\quad \quad \text{(dummy bits of third bit map } A3 \text{ in each perirod)} \times \\
&\quad \quad \text{(number of symbols having} \\
&\quad \quad \text{dummy bits in one hyperframe))} + \\
&\quad \text{((maximum number of bits available in } FEXT \text{ section)} - \\
&\quad \quad \text{(number of bits of audio data to} \\
&\quad \quad \text{be trasmitted with bit map } A4)) \times \\
&\quad \quad \text{(number of bit maps } A4 \text{ in one hyperframe)} = \\
&\quad \quad ((480 - 54) \times 30 + 2 \times 10) + (384 - 40) \times 96 = 45824 \text{ bits}
\end{aligned}
$$

On the other hand, the number of bits required for transmitting the internet data using the interleaved data buffer route is as follows.

$$
\begin{aligned}
&\text{(Number of bits required for transmitting the} \\
&\quad \text{internet data using the interleaved data buffer route)} = \\
&\quad \text{(transmission rate)} \times \text{(transmission time)} = 512 \times 85 = 43520 \text{ bits}
\end{aligned}
$$

Thus, the internet data using the interleaved data buffer route can be transmitted by being assigned to the unused portion of the bit map A.

Next, an explanation will be given of the case in which the data with the delay time thereof to be suppressed coexist with the data with the delay time thereof not necessarily suppressed and in which the data are transmitted efficiently without any transmission loss by combining the low transmission delay mode and the normal mode using the dual bit map (see FIG. 17). The operation is similar to the case described above.

A calculation example is shown below, in which the maximum number of bits available in the FEXT section and the maximum number of bits available in the NEXT section determined based on the S/N ratio measured during the training period are 384 bits and 8 bits, respectively, and the audio system data of 64 kbps (corresponding to one ISDN telephone, for example) is transmitted through the fast data buffer route in low transmission delay mode, and the internet data of 512 kbps (corresponding to one internet access unit, for example) through the interleaved buffer route in normal mode.

$$
\begin{aligned}
&\text{(Number of bits per symbol of audio data before rate conversion)} = \\
&\quad \text{(transmission rate)} \times \text{(transmission time)} / \\
&\quad \text{(total number of symbols (except for } ISS \text{ (inverse sync symbol)} \\
&\quad \text{and } SS \text{ (sync symbol))} = 64 \text{ kbps} \times 85 \text{ ms} / 340 = 16 \text{ bits.}
\end{aligned}
$$

The bits are distributed in such a manner that the audio data using the fast data buffer route of ten symbols can be transmitted by the symbols (bit map A) of the FEXT section and the symbols (bit map B) of the NEXT section. In this case, the bit map A, if three are included in one period, is called the bit map A3, and if four are included in one period, the bit map A4.

.In the case where one period contains three symbols of bit map A $$
\begin{aligned}
&\text{(Audio data for ten symbols)} = 16 \text{ bits} \times 10 \text{ symbols} = 160 \text{ bits} \\
&\text{(Number of bits of audio data to} \\
&\quad \text{be transmitted with bit map } B \text{ of } 7 \text{ symbols)} = \\
&\quad \text{(maximum number } N \text{ of bits available in } NEXT \text{ section)} \times \\
&\quad \quad 7 \text{ symbols} = 8 \text{ bits} \times 7 \text{ symbols} = 56 \text{ bits} \\
&\text{(Number of bits of audio data to} \\
&\quad \text{be trasmitted with bit map } A3) = \\
&\quad \text{((audio data for ten symbols)} - \text{(number of bits of} \\
&\quad \text{audio data transmissible with seven} \\
&\quad \text{symbols of } NEXT \text{ section))}/3 \\
&\quad \text{symbols} = (160 - 56)/3 = 34.66
\end{aligned}
$$

Thus, the number of bits of the audio data to be transmitted with bit map A3 is determined as 35. As a result, the audio system data using the fast data buffer route for one period can be transmitted in the FEXT section and the NEXT section for one period, and therefore the delay can be suppressed. Also, the bits are distributed to the bit map A in such a manner that the difference with the number of bits distributed to the bit map B is small, and therefore the delay can be suppressed.

.In the case where the bit map A contain four symbols per period $$
\begin{aligned}
&\text{(Audio data for ten symbols)} = 16 \text{ bits} \times 10 \text{ symbols} = 160 \text{ bits} \\
&\text{(Number of bits of audio data} \\
&\quad \text{transmissible with bit map } B \text{ of } 6 \text{ symbols)} = \\
&\quad \text{(maximum number N of bits available in } NEXT \text{ section)} \times \\
&\quad \quad 6 \text{ symbols} = 8 \text{ bits} \times 6 \text{ symbols} = 48 \text{ bits} \\
&\text{(Number of bits of audio data to} \\
&\quad \text{be trasmitted with bit map } A) = \\
&\quad \text{((audio data for ten symbols)} - \text{(number of bits of} \\
&\quad \text{audio data transmissible by } 6 \text{ symbols of} \\
&\quad NEXT \text{ section))}/4 \text{ symbols} = (160 - 48)/4 = 28
\end{aligned}
$$

Thus, the number of bits of audio data to be transmitted with the symbols of the FEXT section, i.e. with the bit map A4 is determined as 28. As a result, the data of the audio system using the fast data buffer route for one period can be transmitted in the FEXT section and the NEXT section of one period, and therefore the delay can be suppressed. Also, since the bits are distributed in such a manner as to minimize the difference between the number of bits distributed to the bit map A and the number of bits distributed to the bit map B, the delay can be suppressed.

Also, in view of the fact that the audio system data using the fast data buffer route is assigned to all the bit maps B, the internet data using the interleaved data buffer route are assigned to the unused portion of the bit map A.

$$
\begin{aligned}
&(\text{Unused portion of bit map } A \text{ in one hyperframe}) = \\
&\quad (\text{unused protion of bit map } A3 \text{ in one hyperframe}) + \\
&\quad (\text{unused portion of bit map } A4 \text{ in one hyperframe}) = \\
&\quad ((\text{maximum number of bits available in } FEXT \text{ section}) - \\
&\quad\quad (\text{number of audio data bits to be} \\
&\quad\quad \text{transmitted with bit map } A3)) \times \\
&\quad (\text{number of bit maps } A3 \text{ in one hyperframe}) + \\
&\quad ((\text{maximum number of bits available in } FEXT \text{ section}) - \\
&\quad\quad (\text{number of audio data bits to be} \\
&\quad\quad \text{transmitted with bit map } A4)) \times \\
&\quad (\text{number of bit maps } A4 \text{ in one hyperframe}) = \\
&\quad (384 - 35) \times 30 + (384 - 28) \times 96 = 44646 \text{ bits}
\end{aligned}
$$

On the other hand, the number of bits required for transmitting the internet data using the interleaved data buffer route is as follows.

$$
\begin{aligned}
&(\text{the number of bits required for transmitting the} \\
&\quad \text{internet data using the interleaved data buffer route}) = \\
&\quad (\text{transmission rate}) \times (\text{transmission time}) = 512 \times 85 = 43520 \text{ bits}
\end{aligned}
$$

Thus, the internet data using the interleaved data buffer route can be transmitted by being assigned to the unused portion of the bit map A.

In the case where the audio data coexist with the internet data for transmission in the manner described above, the low transmission delay mode or the normal mode is appropriately selected and bits are distributed for each of the audio data and the internet data. The multiplexed transmission based on such bit distribution makes possible the transmission of the audio data by a communication method smaller in transmission delay and the internet data by the normal communication method, without causing the transmission loss. Thus, the disadvantage that the transmission loss occurs in low transmission delay mode is eliminated. In the case where a STM (synchronous transfer mode) is provided as a backbone of the network, the data are transmitted from an ADSL terminal equipment to an ADSL office equipment to the STM network to an ADSL office equipment to an ADSL terminal equipment in that order.

Figure 18:
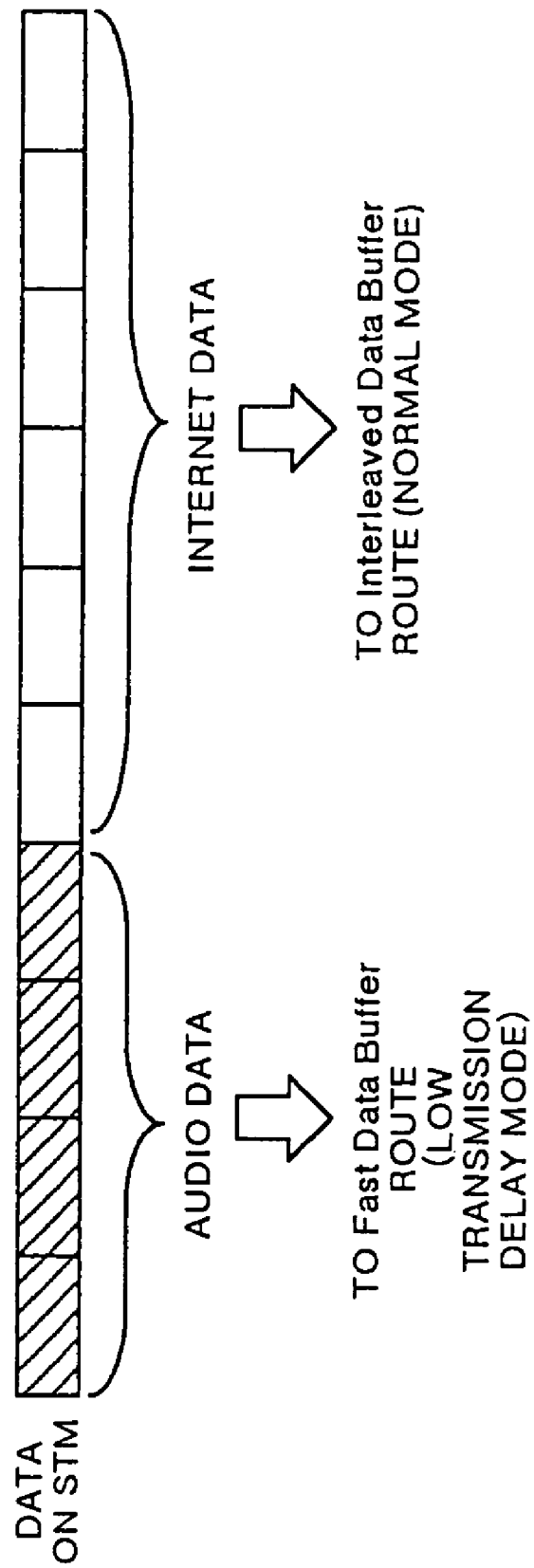
FIG. 18 is a diagram for explaining the slot configuration of the data transmitted and received between the ADSL office equipment according to the present invention.
Figure 19:
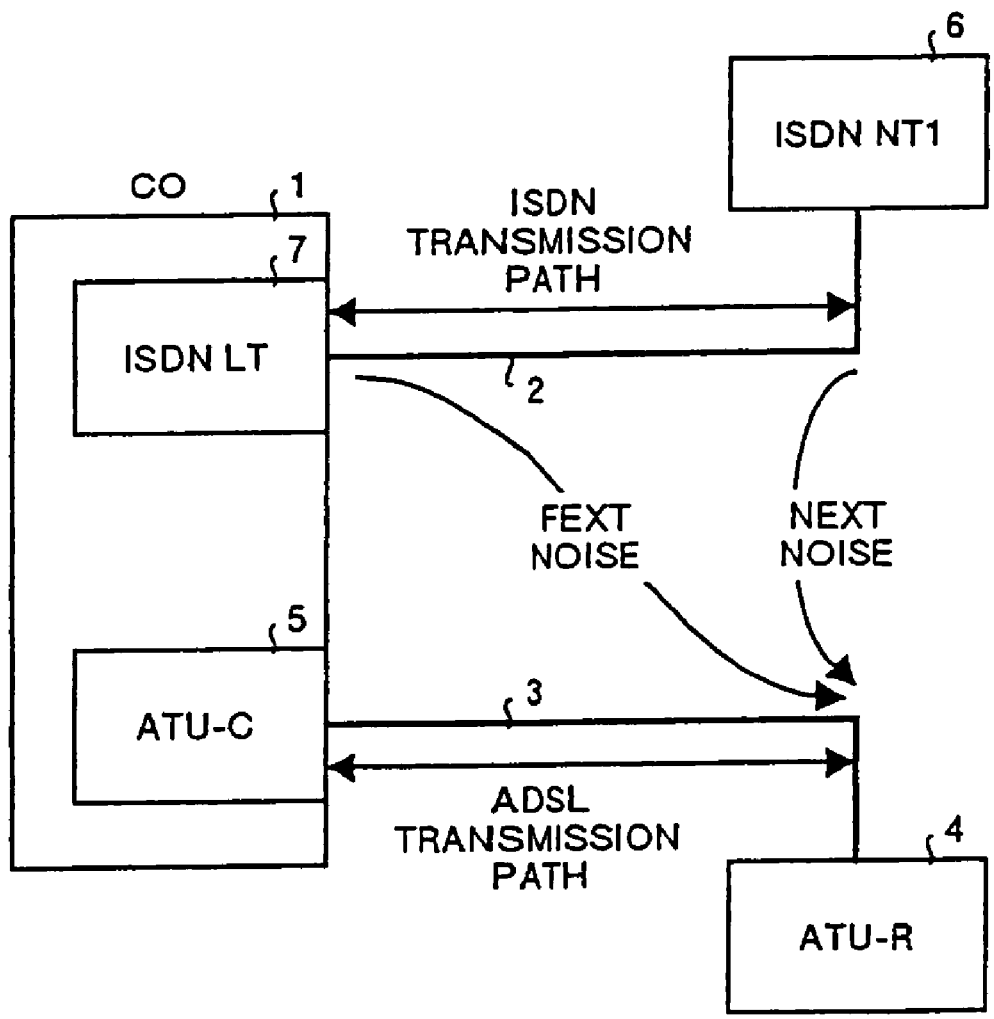
FIG. 19 is a diagram for explaining the behavior of the interference noises between the transmission paths.

The data are caused to flow in time series with a 10-slot configuration as shown in FIG. 18 between the ADSL office equipment through the STM network. As described above, the low transmission delay mode controller 61 (FIG. 14) and 161 (FIG. 15) have the function of controlling the data transmission and receiving in the manner described above, the function of detecting the synchronism and the position of the timing so that the slots storing the audio data and the slots storing the internet data may be determined in advance, and the function of selecting a data route based on the detection and controlling the particular route in low transmission delay mode or normal mode. The low transmission delay controllers 61, 161 thus control the data transmission in accordance with the table prepared by the initialization process or an instruction from the upper-level layer.

Also, it is possible to transmit other data using the portion which becomes available by assigning the data of normal mode to the portion of dummy bits generated in low transmission delay mode.

Further, although according to the present embodiment, the data of normal mode are distributed the same way for the bit map A3 and as for the bit map A4, the bit distribution may be changed for transmission in such a manner that the maximum number of bits used in the bit map A is the same for the bit map A3 and the bit map A4. This makes it possible to meet the situation in which the maximum number of bits available in the FEXT section determined based on the S/N ratio measured during the training period is small.

Figure 16:
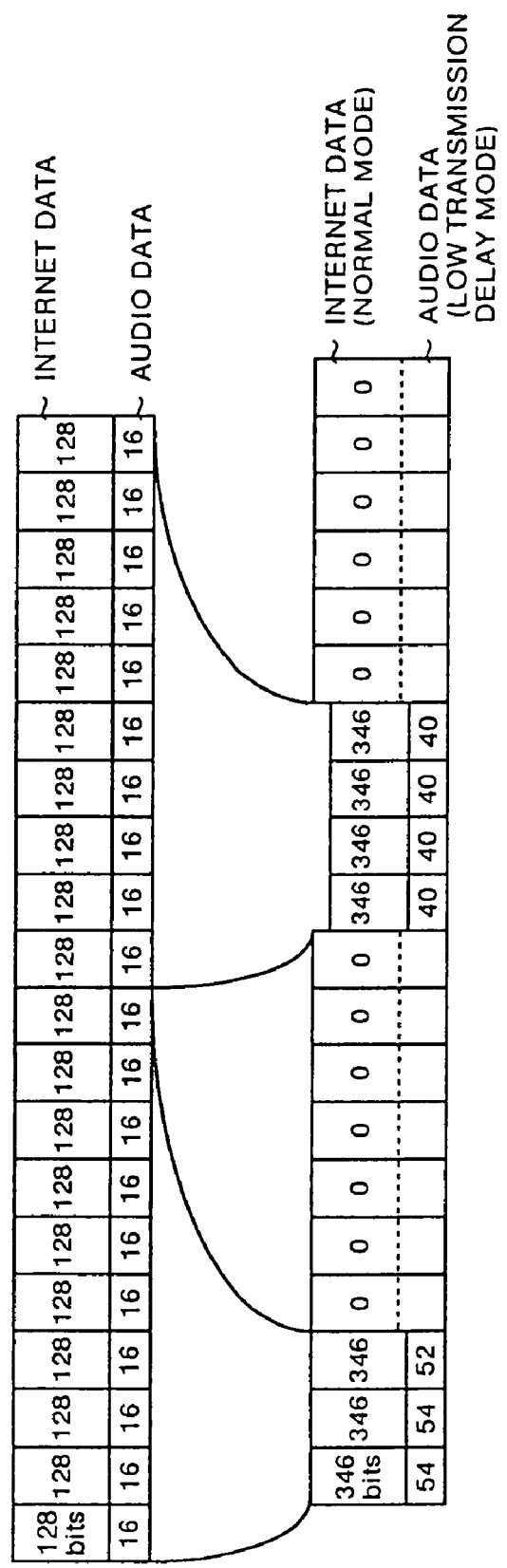
FIG. 16 is a diagram for explaining the bit assignment for a communication system according to the present invention.
Figure 17:
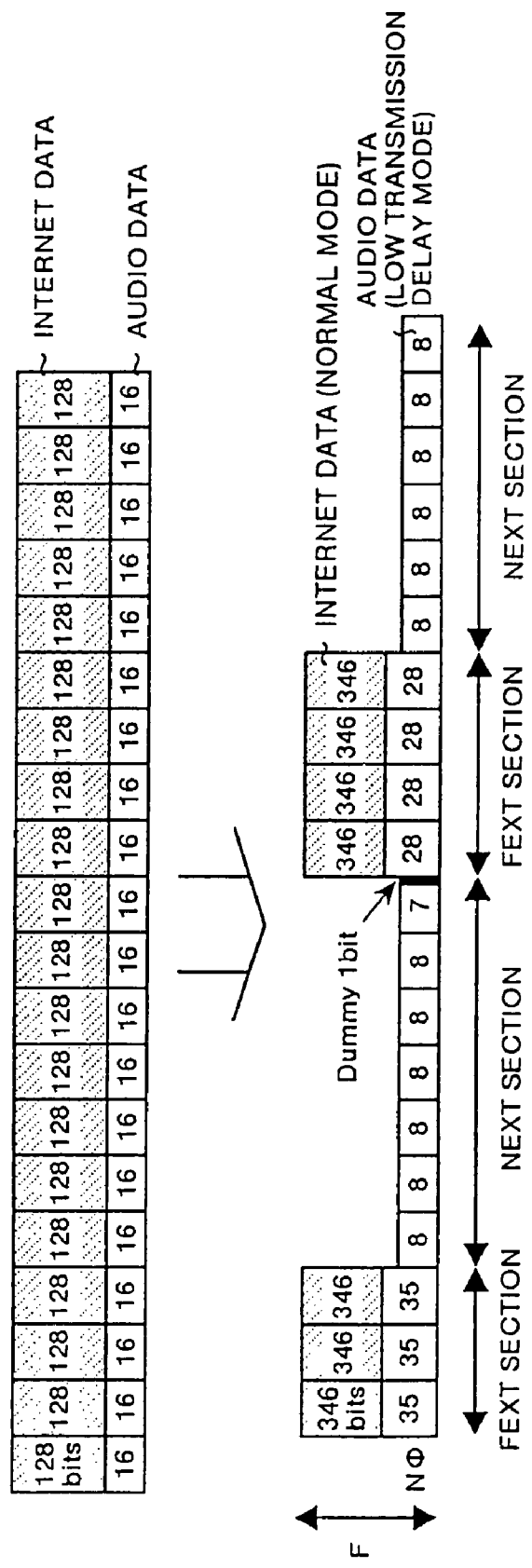
FIG. 17 is a diagram for explaining the bit assignment for a communication system according to the present invention.

Also, the data are distributed uniformly over the data transmission time providing the time suitable for data transmission in a period, and the position in which dummy bits are inserted is not limited to those shown in FIG. 16 and FIG. 17 but may be the portion in time domain located before the symbols.

Although this embodiment uses m12, m13 in the table for initialization as a flag for selecting the low transmission delay mode or the normal mode, a similar effect can be obtained by use of other portions. Also, a similar effect can be attained by attaching a flag to the data itself or providing other method of selection.

Further, in this embodiment, in spite of the foregoing description of the case in which a request has been received from an upper-level layer which is selected, low transmission delay mode or normal mode, a similar effect is obtained by means for automatically selecting one of the two modes in accordance with the type of audio data or image data.

Also, instead of the assumed environment in which an ISDN telephone (64 kbps) or equivalent and an internet access unit (512 kbps) are used at the same time, other applications or the use of other transmission rates leads to a similar effect.

The foregoing description represents an example in which the audio data are transmitted through the fast data buffer route and processed in low transmission delay mode, while the internet data are transmitted through the interleaved data buffer route and processed in normal mode. Nevertheless, other routes and other processing modes can be selected according to the data type.

The functions indicated using the functional configuration diagram in the foregoing description can be realized using either H/W or S/W.

As described above, there is provided a communication system for setting a data transmission time constituting the time suitable for data transmission in a period and a quasi-data transmission time constituting the time other than the data transmission time in the same period in accordance with the transmission path, wherein bits are assigned so that the first data for one period can be transmitted during the data transmission time of the particular period and the first data are distributed uniformly over the data transmission time of the period, thus making it possible to suppress the transmission delay.

Also, there is provided a communication system for setting a data transmission time constituting the time suitable for data transmission in a period and a quasi-data transmission time constituting the time other than the data transmission time in the same period in accordance with the transmission path, wherein bits are assigned so that the data for one period can be transmitted during the data transmission time and the quasi-data transmission time of the particular period and the data are distributed uniformly over each of the data transmission time and the quasi-data transmission time of the period, thus making it possible to suppress the transmission delay.

Also, there is provided a communication system for setting a data transmission time constituting the time suitable for data transmission in a period and a quasi-data transmission time constituting the time other than the data transmission time in the same period in accordance with the transmission path and transmitting by multiplexing first and second data, wherein bits are assigned so that the first data for one period can be transmitted during the data transmission time of the particular period and the first data are distributed uniformly over the data transmission time of the period, and wherein the second data of a predetermined period can be transmitted in the portion of the data transmission time of the predetermined period where the first data have not been assigned, thus making it possible to suppress both the transmission loss and the transmission delay.

Also, there is provided a communication system for setting a data transmission time constituting the time suitable for data transmission in a period and a quasi-data transmission time constituting the time other than the data transmission time in the same period in accordance with the transmission path and transmitting by multiplexing first and second data, wherein bits are assigned so that the first data for one period can be transmitted during the data transmission time and the quasi-data transmission time of the particular period and the first data are distributed uniformly over each of the data transmission time and the quasi-data transmission time of the period, and wherein the second data of a predetermined period can be transmitted in the portion of the data transmission time and the quasi-data transmission time of the predetermined period where the first data have not been assigned, thus making it possible to suppress both the transmission loss and the transmission delay.

Also, there is provided a communication system for setting a data transmission time constituting the time suitable for data transmission in a period and a quasi-data transmission time constituting the time other than the data transmission time in the same period in accordance with the transmission path, wherein bits are assigned so that the data for one period can be transmitted during the data transmission time of the particular period, the data so transmitted and distributed uniformly over the data transmission time of the period are received, and all the data for the particular period are reproduced based on the portion of the received data assigned to the data transmission time of the same period, thus making it possible to suppress the transmission delay.

Also, there is provided a communication system for setting a data transmission time constituting the time suitable for data transmission in a period and a quasi-data transmission time constituting the time other than the data transmission time in the same period in accordance with the transmission path, wherein bits are assigned so that the data for one period can be transmitted during the data transmission time and the quasi-data transmission time of the particular period, the data so transmitted and distributed uniformly over each of the data transmission time and the quasi-data transmission time of the period are received, and all the data for the particular period are reproduced based on the portion of the received data assigned to the data transmission time and the quasi-data transmission time of the same period, thus making it possible to suppress the transmission delay.

Also, there is provided a communication system for setting a data transmission time constituting the time suitable for data transmission in a period and a quasi-data transmission time constituting the time other than the data transmission time in the same period in accordance with the transmission path and transmitting by multiplexing first and second data, wherein bits are assigned so that the first data for one period can be transmitted during the data transmission time of the particular period and the first data are distributed uniformly over the data transmission time of the period, so that the second data of a predetermined period can be transmitted in the portion of the data transmission time of the predetermined period where the first data have not been assigned, and so that the data so assigned and transmitted are received and all the first data of one period are reproduced based on the portion of the received first data assigned to the data transmission time for the period, and wherein all the second data of a predetermined period are reproduced based on the received second data assigned to the data transmission time of the predetermined period, thus making it possible to suppress the transmission delay.

Also, there is provided a communication system for setting a data transmission time constituting the time suitable for data transmission in a period and a quasi-data transmission time constituting the time other than the data transmission time in the same period in accordance with the transmission path and transmitting by multiplexing first and second data, wherein bits are assigned so that the first data for one period can be transmitted during the data transmission time and the quasi-transmission time of the particular period and the first data are distributed uniformly over each of the data transmission time and the quasi-data transmission time of the period, and so that the second data of a predetermined period can be transmitted in the portion of the data transmission time and the quasi-data transmission time of the predetermined period where the first data have not been assigned, wherein the data so assigned and transmitted are received, and all the first data of one period are reproduced based on the portion of the received first data assigned to the data transmission time and the quasi-data transmission time, while all the second data of a predetermined period are reproduced based on the portion of the received second data assigned to the data transmission time and the quasi-data transmission time of the predetermined period, thus making it possible to suppress both the transmission loss and the transmission delay.

Also, there is provided a communication method for setting a data transmission time constituting the time suitable for data transmission in a period and a quasi-data transmission time constituting the time other than the data transmission time in the same period in accordance with the transmission path, wherein bits are assigned so that the first data for one period can be transmitted during the data transmission time of the particular period and the first data are distributed uniformly over the data transmission time of the period, thus making it possible to suppress the transmission delay.

Also, there is provided a communication method for setting a data transmission time constituting the time suitable for data transmission in a period and a quasi-data transmission time constituting the time other than the data transmission time in the same period in accordance with the transmission path, wherein bits are assigned so that the data for one period can be transmitted during the data transmission time and the quasi-data transmission time of the particular period and the data are distributed uniformly over each of the data transmission time and the quasi-data transmission time of the period, thus making it possible to suppress the transmission delay.

Also, there is provided a communication method for setting a data transmission time constituting the time suitable for data transmission in a period and a quasi-data transmission time constituting the time other than the data transmission time in the same period in accordance with the transmission path and transmitting by multiplexing first and second data, wherein bits are assigned so that the first data for one period can be transmitted during the data transmission time of the particular period and the first data are distributed uniformly over the data transmission time of the period, and wherein the second data of a predetermined period can be transmitted in the portion of the data transmission time of the predetermined period where the first data have not been assigned, thus making it possible to suppress both the transmission loss and the transmission delay.

Also, there is provided a communication method for setting a data transmission time constituting the time suitable for data transmission in a period and a quasi-data transmission time constituting the time other than the data transmission time in the same period in accordance with the transmission path and transmitting by multiplexing first and second data, wherein bits are assigned so that the first data for one period can be transmitted during the data transmission time and the quasi-data transmission time of the particular period and the first data are distributed uniformly over each of the data transmission time and the quasi-data transmission time of the period, and wherein the second data of a predetermined period can be transmitted in the portion of the data transmission time and the quasi-data transmission time of the predetermined period where the first data have not been assigned, thus making it possible to suppress both the transmission loss and the transmission delay.

Also, there is provided a communication method for setting a data transmission time constituting the time suitable for data transmission in a period and a quasi-data transmission time constituting the time other than the data transmission time in the same period in accordance with the transmission path, wherein bits are assigned so that the data for one period can be transmitted during the data transmission time of the particular period, the data so transmitted and distributed uniformly over the data transmission time of the period are received, and all the data for the particular period are reproduced based on the portion of the received data assigned to the data transmission time of the same period, thus making it possible to suppress the transmission delay.

Also, there is provided a communication method for setting a data transmission time constituting the time suitable for data transmission in a period and a quasi-data transmission time constituting the time other than the data transmission time in the same period in accordance with the transmission path, wherein bits are assigned so that the data for one period can be transmitted during the data transmission time and the quasi-data transmission time of the particular period, the data so transmitted and distributed uniformly over each of the data transmission time and the quasi-data transmission time of the period are received, and all the data for the particular period are reproduced based on the portion of the received data assigned to the data transmission time and the quasi-data transmission time of the same period, thus making it possible to suppress the transmission delay.

Also, there is provided a communication method for setting a data transmission time constituting the time suitable for data transmission in a period and a quasi-data transmission time constituting the time other than the data transmission time in the same period in accordance with the transmission path and transmitting by multiplexing first and second data, wherein bits are assigned so that the first data for one period can be transmitted during the data transmission time of the particular period and the first data are distributed uniformly over the data transmission time of the period, so that the second data of a predetermined period can be transmitted in the portion of the data transmission time of the predetermined period where the first data have not been assigned, and so that the data so assigned and transmitted are received and all the first data of one period are reproduced based on the portion of the received first data assigned to the data transmission time for the period, and wherein all the second data of a predetermined period are reproduced based on the received second data assigned to the data transmission time of the predetermined period, thus making it possible to suppress both the transmission loss and the transmission delay.

Also, there is provided a communication method for setting a data transmission time constituting the time suitable for data transmission in a period and a quasi-data transmission time constituting the time other than the data transmission time in the same period in accordance with the transmission path and transmitting by multiplexing first and second data, wherein bits are assigned so that the first data for one period can be transmitted during the data transmission time and the quasi-transmission time of the particular period and the first data are distributed uniformly over each of the data transmission time and the quasi-data transmission time of the period, and so that the second data of a predetermined period can be transmitted in the portion of the data transmission time and the quasi-data transmission time of the predetermined period where the first data have not been assigned, wherein the data so assigned and transmitted are received, and all the first data of one period are reproduced based on the portion of the received first data assigned to the data transmission time and the quasi-data transmission time, while all the second data of a predetermined period are reproduced based on the portion of the received second data assigned to the data transmission time and the quasi-data transmission time of the predetermined period, thus making it possible to suppress both the transmission loss and the transmission delay.

FIELD OF INDUSTRIAL APPLICABILITY

As described above, the communication system and the communication method according to the present invention is suitable for the communication schemes performed for data communication of discrete multi-tone modem type, for example, between a plurality of data communication units through the public telephone line.

The invention claimed is:
1. A communication system that performs data communication between data communication units, comprising:
a setting unit configured to set a data transmission duration for a given period of a periodic transmission timing, and suitable for data transmission in view of a cyclical interference noise;
an organizing unit configured to organize a set of data bits to be transmitted during the given period into units of symbols; and
an assigning unit configured to assign the data bits in the symbols to bit spaces allocated for transmission in such a manner that all the symbols into which the data bits to be transmitted within the given period are organized can be wholly transmitted during the data transmission duration within the given period, and the assigned data bits is distributed substantially uniformly over the data transmission duration within the given period, wherein the organizing unit organizes the set of data bits into the units of symbols before the assigning unit assigns the data bits to the bit spaces allocated for transmission.

2. A data transmitting apparatus, comprising:

a rate converter configured to perform rate conversion on an input data stream including a plurality of input symbols, and configured to generate an output data stream including a plurality of sets of output symbols, each set being defined based on cyclic ISDN noise, the bits in each output symbol being distributed based on a bitmap, and each output symbol having a time length different from a time length of the corresponding input symbol;

a FEXT symbol recognizing unit configured to recognize a plurality of specific output symbols in each of the sets of output symbols as FEXT symbols that are suitable for data transmission in terms of the cyclic ISDN noise; and a bit assigning unit configured to assign bits to output symbols in such a manner that when the set of output symbols has four FEXT symbols, a number of bits in a bitmap for each of the four FEXT symbols in the set is obtained based on a quotient calculated by dividing by four a total number of bits in a certain number of input symbols having a total time length corresponding to a time length of one cycle of the ISDN noise.

3. A data transmitting method, comprising:

a rate converting step of performing rate conversion on an input data stream including a plurality of input symbols, and thereby generating an output data stream including a plurality of sets of output symbols, each set being defined based on cyclic ISDN noise, the bits in each output symbol being distributed based on a bitmap, and each output symbol having a time length different from a time length of the corresponding input symbol;

a FEXT recognizing step of recognizing a plurality of specific output symbols in each of the set of output symbols as FEXT symbols that are suitable for data transmission in terms of the cyclic ISDN noise, and a bit assigning step of assigning bits to output symbols in such a manner that when the set of output symbols has four FEXT symbols, a number of bits in a bitmap for each of the four FEXT symbols in the set is obtained based on a quotient calculated by dividing by four a total number of bits in a certain number of input symbols having a total time length corresponding to the time length of one cycle of the ISDN noise.

* * * * *

UNITED STATES PATENT AND TRADEMARK OFFICE
CERTIFICATE OF CORRECTION

PATENT NO. : 7,801,170 B2
APPLICATION NO. : 11/785012
DATED : September 21, 2010
INVENTOR(S) : Wataru Matsumoto et al.

Page 1 of 1

It is certified that error appears in the above-identified patent and that said Letters Patent is hereby corrected as shown below:

ON THE TITLE PAGE:

Item (62), Related U.S. Application Data, should read as follows:

-- Division of application No. 09/559,175, filed on Apr. 27, 2000, now Pat. No. 7,457,309, which is a continuation of application No. PCT/JP99/02612, filed on May 19, 1999. --

Signed and Sealed this
Fifteenth Day of February, 2011

David J. Kappos
*Director of the United States Patent and Trademark Office*